United States Patent
Shimada

(10) Patent No.: US 12,382,195 B2
(45) Date of Patent: Aug. 5, 2025

(54) IMAGE PICKUP APPARATUS AND IMAGE PROCESSING METHOD

(71) Applicant: OLYMPUS CORPORATION, Hachioji (JP)

(72) Inventor: Yoshinao Shimada, Hino (JP)

(73) Assignee: Olympus Corporation, Tokyo (JP)

( * ) Notice: Subject to any disclaimer, the term of this patent is extended or adjusted under 35 U.S.C. 154(b) by 245 days.

(21) Appl. No.: 18/206,568

(22) Filed: Jun. 6, 2023

(65) Prior Publication Data

US 2023/0412940 A1   Dec. 21, 2023

(30) Foreign Application Priority Data

Jun. 21, 2022 (JP) .................... 2022-099785

(51) Int. Cl.
*H04N 25/628* (2023.01)
*H04N 17/00* (2006.01)

(52) U.S. Cl.
CPC ......... *H04N 25/628* (2023.01); *H04N 17/002* (2013.01)

(58) Field of Classification Search
CPC ............................ H04N 25/628; H04N 17/002
USPC ................................................... 348/207.99
See application file for complete search history.

(56) References Cited

U.S. PATENT DOCUMENTS

2015/0109490 A1* 4/2015 Kanemitsu ............. H04N 25/68
    348/246
2023/0012537 A1   1/2023 Shimada

FOREIGN PATENT DOCUMENTS

WO    WO 2021/192176    9/2021

* cited by examiner

*Primary Examiner* — Joel W Fosselman
(74) *Attorney, Agent, or Firm* — John C. Pokotylo; Pokotylo Patent Services

(57) ABSTRACT

A pixel region includes: pixels each including a plurality of photoelectric conversion devices; a light-shielding region; and an effective region. A reading circuit reads, from a first row of the pixel region, a pixel signal obtained by adding signals of the plurality of photoelectric conversion devices, and reads, from a second row of the pixel region, a plurality of signals including phase difference information. A horizontal streak correction circuit performs one of a first offset correction based on a signal read from the light-shielding region and a second offset correction based on a predetermined value on a pixel signal obtained from a second row of the effective region. An image processing circuit processes image data according to a parameter. The horizontal streak correction circuit selects the first offset correction or the second offset correction according to the parameter.

20 Claims, 23 Drawing Sheets

FIG. 3

|  |  | 1ST COLUMN | 2ND COLUMN | 3RD COLUMN | 4TH COLUMN | (LAST-3)-TH COLUMN | (LAST-2)-TH COLUMN | (LAST-1)-TH COLUMN | LAST COLUMN |
|---|---|---|---|---|---|---|---|---|---|
| 1ST ROW | L | Rr | Gr | Rr | Gr | Rr | Gr | Rr | Gr |
| | (L+R) | Rr | Gr | Rr | Gr | Rr | Gr | Rr | Gr |
| 2ND ROW | L | Gb | Bb | Gb | Bb | Gb | Bb | Gb | Bb |
| | (L+R) | Gb | Bb | Gb | Bb | Gb | Bb | Gb | Bb |
| (LAST-1)-TH ROW | L | Rr | Gr | Rr | Gr | Rr | Gr | Rr | Gr |
| | (L+R) | Rr | Gr | Rr | Gr | Rr | Gr | Rr | Gr |
| LAST ROW | L | Gb | Bb | Gb | Bb | Gb | Bb | Gb | Bb |
| | (L+R) | Gb | Bb | Gb | Bb | Gb | Bb | Gb | Bb |

FIG. 5

| | | 1ST COLUMN | 2ND COLUMN | 3RD COLUMN | 4TH COLUMN | (LAST-3)-TH COLUMN | (LAST-2)-TH COLUMN | (LAST-1)-TH COLUMN | LAST COLUMN |
|---|---|---|---|---|---|---|---|---|---|
| 1ST ROW | ALL | Rr | Gr | Rr | Gr | Rr | Gr | Rr | Gr |
| 2ND ROW | ALL | Gb | Bb | Gb | Bb | Gb | Bb | Gb | Bb |
| P-TH ROW | L | Rr | Gr | Rr | Gr | Rr | Gr | Rr | Gr |
|  | (L+R) | Rr | Gr | Rr | Gr | Rr | Gr | Rr | Gr |
| P+1TH ROW | L | Gb | Bb | Gb | Bb | Gb | Bb | Gb | Bb |
|  | (L+R) | Gb | Bb | Gb | Bb | Gb | Bb | Gb | Bb |
| P+2TH ROW | ALL | Rr | Gr | Rr | Gr | Rr | Gr | Rr | Gr |
| P+3TH ROW | ALL | Gb | Bb | Gb | Bb | Gb | Bb | Gb | Bb |
| (LAST-1)-TH ROW | L | Rr | Gr | Rr | Gr | Rr | Gr | Rr | Gr |
|  | (L+R) | Rr | Gr | Rr | Gr | Rr | Gr | Rr | Gr |
| LAST ROW | L | Gb | Bb | Gb | Bb | Gb | Bb | Gb | Bb |
|  | (L+R) | Gb | Bb | Gb | Bb | Gb | Bb | Gb | Bb |

FIG. 17

|  | REPETITIVE VARIATION | TEMPERATURE DEPENDENCY |
|---|---|---|
| VOB METHOD | DISADVANTAGEOUS | ADVANTAGEOUS |
| ADJUSTING METHOD | ADVANTAGEOUS | DISADVANTAGEOUS |

| LOW TEMPERATURE, HIGH TEMPERATURE (OTHER THAN ADJUSTING CONDITION) | CORRECTION ACCURACY | |
|---|---|---|
| | LOW ISO | HIGH ISO |
| VOB METHOD | HIGH | LOW |
| ADJUSTING METHOD | LOW | HIGH |

| NORMAL TEMPERATURE (ADJUSTING CONDITION) | CORRECTION ACCURACY | |
|---|---|---|
| | LOW ISO | HIGH ISO |
| VOB METHOD | HIGH | LOW |
| ADJUSTING METHOD | HIGH | HIGH |

FIG. 28

| | | 1ST COLUMN | 2ND COLUMN | 3RD COLUMN | 4TH COLUMN | (LAST-3)-TH COLUMN | (LAST-2)-TH COLUMN | (LAST-1)-TH COLUMN | LAST COLUMN |
|---|---|---|---|---|---|---|---|---|---|
| 1ST ROW | ALL | Rr | Gr | Rr | Gr | Rr | Gr | Rr | Gr |
| 2ND ROW | ALL | Gb | Bb | Gb | Bb | Gb | Bb | Gb | Bb |
| P-TH ROW | L | Rr | Gr | Rr | Gr | Rr | Gr | Rr | Gr |
| | R | Rr | Gr | Rr | Gr | Rr | Gr | Rr | Gr |
| P+1TH ROW | L | Gb | Bb | Gb | Bb | Gb | Bb | Gb | Bb |
| | R | Gb | Bb | Gb | Bb | Gb | Bb | Gb | Bb |
| P+2TH ROW | ALL | Rr | Gr | Rr | Gr | Rr | Gr | Rr | Gr |
| P+3TH ROW | ALL | Gb | Bb | Gb | Bb | Gb | Bb | Gb | Bb |
| (LAST-1)-TH ROW | L | Rr | Gr | Rr | Gr | Rr | Gr | Rr | Gr |
| | R | Rr | Gr | Rr | Gr | Rr | Gr | Rr | Gr |
| LAST ROW | L | Gb | Bb | Gb | Bb | Gb | Bb | Gb | Bb |
| | R | Gb | Bb | Gb | Bb | Gb | Bb | Gb | Bb |

IMAGE PICKUP APPARATUS AND IMAGE PROCESSING METHOD

CROSS REFERENCE TO RELATED APPLICATION

This application claims benefit of Japanese Application No. 2022-099785 filed in Japan on Jun. 21, 2022, the entire contents of which are incorporated herein by this reference.

BACKGROUND OF THE INVENTION

1. Field of the Invention

The present invention relates to an image pickup apparatus and an image processing method that read a plurality of signals including phase difference information from a pixel having one microlens and a plurality of photoelectric conversion devices.

2. Description of the Related Art

In recent years, PD-division type image plane phase difference image sensors (PD-division type sensors) have been proposed. Such PD-division type sensors have a structure in which a photoelectric conversion device (PD: photodetector) in one pixel is divided. Compared with light-shielding type image plane phase difference image sensors configured to shield part of a light ray incident on a PD, the PD-division type sensors have a high focus detection accuracy, since a pair (for example, a left-right pair, an up-down pair, or the like) of pixels between which a phase difference is detected can be configured within one pixel. Furthermore, the PD-division type sensors are configured to obtain a pixel value of normal one pixel by adding values of a pair of phase difference pixels, to thereby be capable of generating an image.

However, in a PD-division type sensor in which one pixel is divided into n PDs, the number of PDs becomes n times that of a normal non-image-plane phase difference image sensor having one PD per pixel, if these sensors have the same number of pixels. As a result, signal reading time of the PD-division type sensor is n times that of the normal image sensor, and an image pickup rate is 1/n of that of the normal image sensor.

In order to suppress an increase in signal reading time, International Publication WO2021/192176, for example, discloses a technique of a high-speed video phase difference reading mode in which, for a certain row, a pixel signal obtained by adding all signals of a plurality of PDs in each pixel is read in a first reading mode, and for another row, a plurality of signals including phase difference information are read from a plurality of PDs in each pixel in a second reading mode. According to the high-speed video phase difference reading mode, the signal reading time can be suppressed to less than twice, for example, by adjusting the number of rows to which the first reading mode is applied and the number of rows to which the second reading mode is applied.

At this time, there is a difference in OB (Optical Black) levels between a value of one pixel (first pixel value) read in the first reading mode and a value of one pixel (second pixel value) obtained from a pair of phase difference pixels read in the second reading mode. In view of the above, International Publication WO2021/192176 further discloses a correction technique in which, based on the first pixel value and the second pixel value that are acquired from a vertical OB region, an OB level of a second pixel value acquired from an effective region is made close to an OB level of a first pixel acquired from the effective region.

SUMMARY OF THE INVENTION

An image pickup apparatus according to one aspect of the present invention includes: a pixel region in which a plurality of pixels each including one microlens and a plurality of photoelectric conversion devices are two-dimensionally arranged in a unit of row, the pixel region comprising a light-shielding region having a plurality of light-shielded rows, and an effective region having a plurality of rows to which light reaches; a reading circuit configured to read, from each pixel in a first row of each of the light-shielding region and the effective region, a pixel signal obtained by adding all signals of the plurality of photoelectric conversion devices, and to read, from each pixel in a second row of each of the light-shielding region and the effective region, a plurality of signals including phase difference information; a horizontal streak correction circuit configured to perform one of a first offset correction and a second offset correction on a pixel signal obtained from the plurality of signals read from the second row of the effective region, the first offset correction being based on the pixel signal read from the first row of the light-shielding region and the plurality of signals read from the second row of the light-shielding region, the second offset correction being based on a value determined in advance; and an image processing circuit configured to perform image processing on image data according to a parameter, the image data being configured based on the pixel signal subjected to the first offset correction or the second offset correction and the pixel signal read from the first row of the effective region. The horizontal streak correction circuit selects which of the first offset correction and the second offset correction to perform, according to the parameter.

An image pickup apparatus according to another aspect of the present invention includes: a pixel region in which a plurality of pixels each including one microlens and a plurality of photoelectric conversion devices are two-dimensionally arranged in a unit of row, the pixel region comprising a light-shielding region having a plurality of light-shielded rows and an effective region having a plurality of rows to which light reaches; a reading circuit configured to read, from each pixel in a first row of each of the light-shielding region and the effective region, a pixel signal obtained by adding all signals of the plurality of photoelectric conversion devices, and to read, from each pixel in a second row of each of the light-shielding region and the effective region, a plurality of signals including phase difference information; a horizontal streak correction circuit configured to perform one of a first offset correction and a second offset correction on the pixel signal read from the first row of the effective region, the first offset correction being based on the pixel signal read from the first row of the light-shielding region and the plurality of signals read from the second row of the light-shielding region, the second offset correction being based on a value determined in advance; and an image processing circuit configured to perform image processing on image data according to a parameter, the image data being configured based on the pixel signal subjected to the first offset correction or the second offset correction and the pixel signal obtained from the plurality of signals read from the second row of the effective region. The horizontal streak correction circuit selects which of the first offset correction and the second offset correction to perform, according to the parameter.

An image processing method according to one aspect of the present invention includes: reading a pixel signal obtained by adding all signals of a plurality of photoelectric conversion devices, from each pixel in a first row of each of a light-shielding region and an effective region in a pixel region in which a plurality of pixels each including one microlens and the plurality of photoelectric conversion devices are two-dimensionally arranged in a unit of row, the pixel region comprising the light-shielding region having a plurality of light-shielded rows and the effective region having a plurality of rows to which light reaches; reading a plurality of signals including phase difference information from each pixel in a second row of each of the light-shielding region and the effective region; performing one of a first offset correction and a second offset correction on a pixel signal obtained from the plurality of signals read from the second row of the effective region, the first offset correction being based on the pixel signal read from the first row of the light-shielding region and the plurality of signals read from the second row of the light-shielding region, the second offset correction being based on a value determined in advance; performing image processing on image data according to a parameter, the image data being configured based on the pixel signal subjected to the first offset correction or the second offset correction and the pixel signal read from the first row of the effective region, and selecting which of the first offset correction and the second offset correction to perform, according to the parameter.

BRIEF DESCRIPTION OF THE DRAWINGS

FIG. 3 is a diagram showing an example of signals read in an all-phase-difference reading mode, from the image sensor in the first embodiment.

FIG. 5 is a diagram showing an example of signals read, in a high-speed video phase difference reading mode, from the image sensor in the first embodiment.

FIG. 17 is a chart showing tendencies of a repetitive variation for each frame and adaptability to a temperature change in each of the VOB method and the adjusting method in the first embodiment.

FIG. 28 is a diagram showing an example of signals read from the image sensor in the high-speed video phase difference reading mode with priority for a phase difference detection performance, in the first embodiment.

DETAILED DESCRIPTION OF THE PREFERRED EMBODIMENT(S)

Hereinafter, an embodiment of the present invention will be described with reference to drawings. However, the present invention is not limited by the embodiment to be described below.

First Embodiment

Figure 1:
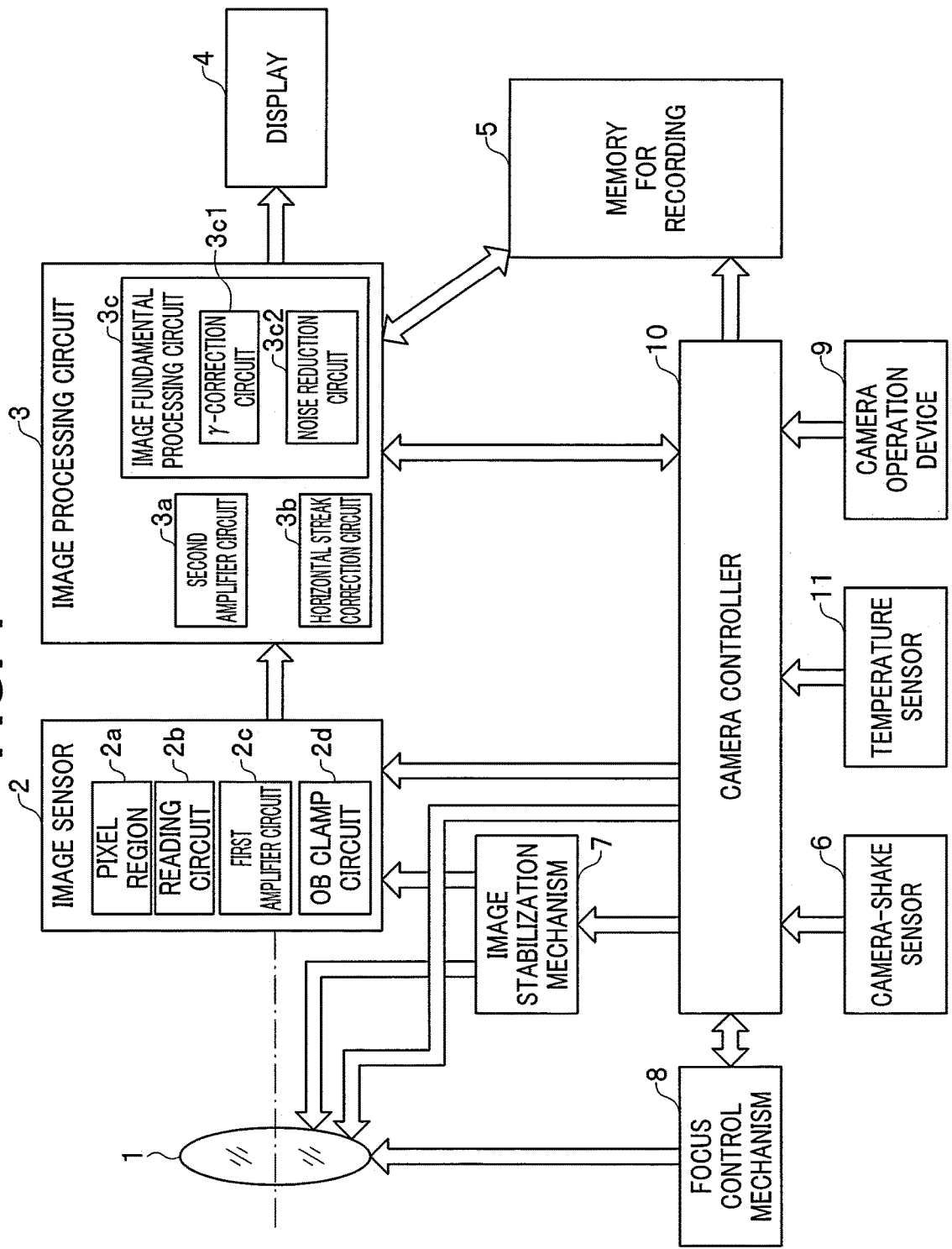
FIG. 1 is a block diagram showing a configuration of an image pickup apparatus in a first embodiment of the present invention.

FIG. 1 to FIG. 28 show the first embodiment of the present invention, and FIG. 1 is a block diagram showing a configuration of an image pickup apparatus.

Note that FIG. 1 shows an example in which the image pickup apparatus is configured as a digital camera, for example. However, the image pickup apparatus is not limited to the digital camera. The image pickup apparatus may be, for example, any of various apparatuses with a shooting function, such as a digital video camera, a telephone apparatus with a shooting function, an electronic endoscope, a microscope with a shooting function, and a telescope with a shooting function, or the like.

As shown in FIG. 1, the image pickup apparatus includes a lens 1, an image sensor 2, an image processing circuit 3, a display 4, a camera-shake sensor 6, an image stabilization mechanism 7, a focus control mechanism 8, a camera operation device 9, a camera controller 10, and a temperature sensor 11. Note that a memory for recording 5 shown in FIG. 1 may be attachable to and detachable from the image pickup apparatus. Therefore, the memory for recording 5 may not be a component inherent in the image pickup apparatus.

The lens 1 is an image pickup optical system configured to form an optical image of an object on the image sensor 2. The lens 1 according to the present embodiment includes one or more lenses, a diaphragm, and an image stabilization mechanism. The one or more lenses include a focus lens for adjusting a focal position (focus position) to perform focusing. The diaphragm controls a passing range of a light flux passing through the lens 1. The image stabilization mechanism is configured to stabilize the optical image of the object formed on the image sensor 2.

Note that a mechanical shutter for controlling an exposure time may be further provided, for example, between the lens 1 and the image sensor 2. The mechanical shutter can be used for bringing the image sensor 2 into a light-shielded state in a calibration mode to be described later.

The image sensor 2 is disposed on an optical path of a shooting optical axis of the lens 1. The image sensor 2 is configured as a PD-division type image plane phase difference image sensor, as described later. The image sensor 2 includes a pixel region 2a, a reading circuit 2b, a first amplifier circuit 2c, and an OB clamp circuit 2d.

The pixel region 2a is configured to photoelectrically convert the optical image of the object formed by the lens 1, to generate an electric signal. The reading circuit 2b reads the electric signal generated by the pixel region 2a. The electric signal read by the reading circuit 2b is amplified by the first amplifier circuit 2c (sensor amplifier circuit) by a set amplification factor.

In the image sensor 2, a column-parallel A/D converter (column ADC), not shown, is provided. The column ADC is configured to convert an analog electric signal generated by the pixel region 2a into a digital signal. The OB clamp circuit 2d is configured to set an OB level to a predetermined target level (OB clamp level) (fixed value). The image sensor 2 outputs an image pickup signal.

The image processing circuit 3 is configured to receive an input of an image pickup signal outputted from the image sensor 2 and perform various kinds of image processing according to parameters on image data configured based on the inputted image pickup signal. The image processing circuit 3 includes a second amplifier circuit 3a, a horizontal streak correction circuit 3b, and an image fundamental processing circuit 3c.

The second amplifier circuit 3a is configured to amplify, for example, the image pickup signal (or signal subjected to several kinds of image processing) by a set amplification factor (a parameter for image processing). The first amplifier circuit 2c and the second amplifier circuit 3a are configured to perform also signal amplification according to a set ISO sensitivity. Note that only one of the first amplifier circuit 2c and the second amplifier circuit 3a may be provided.

The horizontal streak correction circuit 3b is configured to correct horizontal streaks that occur in the image configured based on the image pickup signal outputted from the image sensor 2 in the high-speed video phase difference reading mode to be described later.

The image fundamental processing circuit 3c is configured to perform various kinds of fundamental image processing for generating an image signal for display or an image signal for recording from the image pickup signal. The image fundamental processing circuit 3c includes a γ-correction circuit 3c1 and a noise reduction circuit 3c2. The γ-correction circuit 3c1 is configured to perform γ correction (also referred to as γ conversion) for non-linearly correcting a signal level of the image signal.

The noise reduction circuit 3c2 is configured to perform noise reduction processing of the image signal at a set noise reduction processing intensity (a parameter for image processing). For example, the higher the ISO sensitivity is set, the higher the amplification factor (gain) (parameter) by the first amplifier circuit 2c and/or the second amplifier circuit 3a.

The amplification factor by the first amplifier circuit 2c and/or the second amplifier circuit 3a is an amplification factor based on both amplification factors of the first and second amplifier circuits (for example, amplification factor obtained by multiplying the both amplification factors) when both the first amplifier circuit 2c and the second amplifier circuit 3a are provided, a sensor amplification factor of the first amplifier circuit 2c when the second amplifier circuit 3a is not provided but the first amplifier circuit 2c is provided, and an amplification factor of the second amplifier circuit 3a when the first amplifier circuit 2c is not provided but the second amplifier circuit 3a is provided. If the amplification factor becomes high, the noise is also amplified. As a result, the noise reduction circuit 3c2 performs the noise reduction processing at a higher intensity.

The image fundamental processing circuit 3c is configured to further perform image processing such as demosaicing processing, white balancing processing, color matrix processing, and edge processing on a Bayer image.

The display 4 is a display device configured to display an image based on the signal subjected to image processing for display by the image processing circuit 3. The display 4 performs a live-view display, a rec-view display of a still image after shooting, a reproduction display of a recorded still image, a display during recording of a moving image, a reproduction display of a recorded moving image, etc., and also displays various kinds of information related to the image pickup apparatus.

The memory for recording 5 is a recording medium configured to save a signal (a still image signal, a moving image signal, etc.) subjected to image processing for recoding by the image processing circuit 3. The memory for recording 5 is configured, for example, by a memory card attachable to and detachable from the image pickup apparatus, or a non-volatile memory provided in the image pickup apparatus.

The camera-shake sensor 6 is a sensing device including an acceleration sensor, an angular velocity sensor, and the like, and configured to detect camera shake of the image pickup apparatus and output camera-shake information to the camera controller 10.

Based on the control by the camera controller 10, the image stabilization mechanism 7 causes at least one of the lens 1 and the image sensor 2 to move by an actuator or the like, based on the camera-shake information detected by the camera-shake sensor 6 so that a position of an optical object image formed by the image sensor 2 is stabilized, even if camera shake occurs.

Based on the control by the camera controller 10, the focus control mechanism 8 drives the focus lens included in the lens 1 so that the object image formed on the image sensor 2 is focused. In addition, the focus control mechanism 8 outputs lens driving information such as a lens position to the camera controller 10.

The camera operation device 9 is an input device for performing various kinds of operations on the image pickup apparatus. The camera operation device 9 includes, for example, operation members such as a power source switch for turning on/off a power source of the image pickup apparatus, a release button for inputting instructions such as a still image shooting or a moving image shooting, an ISO sensitivity setting button for setting the ISO sensitivity, a mode button for setting a still image shooting mode, a moving image shooting mode, a live-view mode, a still image/moving image reproduction mode, etc., and an operation button for setting a type of a file to be recorded (such as a JPEG image file, a RAW image file, or a combination of these files, and the like). Note that when the shooting mode or the like is selected by the mode button, a γ-correction characteristic (γ curve) to be used for γ correction is set according to the shooting mode. However, the γ-correction characteristic may be set manually.

The temperature sensor 11 is configured to measure an environmental temperature of the position where the image sensor 2 is disposed and output a result of the measurement to the camera controller 10.

The camera controller 10 controls the entirety of the image pickup apparatus including the lens 1, the image sensor 2, the image processing circuit 3, the memory for recording 5, the image stabilization mechanism 7, the focus control mechanism 8, etc., based on information (as described later, including information such as an exposure level, a contrast, the phase difference, the γ-correction characteristic, the intensity of the noise reduction processing, etc.) from the image processing circuit 3, the camera-shake information from the camera-shake sensor 6, the lens driving information from the focus control mechanism 8, the input from the camera operation device 9, the environmental temperature measured by the temperature sensor 11, and the like.

For example, the camera controller 10 controls the image sensor 2 to cause the image sensor 2 to perform image pickup. In addition, the camera controller 10 controls the diaphragm of the lens 1 and the exposure time (electronic shutter) of the image sensor 2 or the above-described mechanical shutter, based on the information on the exposure level.

Furthermore, the camera controller 10 controls the focus control mechanism 8, to cause the focus control mechanism 8 to drive the focus lens of the lens 1 to thereby focus the object image formed on the image sensor 2. The control of the focus control mechanism 8 is performed through a phase difference AF (auto focusing) based on the phase difference information obtained from the image sensor 2 configured as an image plane phase difference image sensor, for example. Alternatively, the control of the focus control mechanism 8 may be performed through a contrast AF (auto focusing) based on contrast information of the image obtained from the image sensor 2. Further, the control of the focus control mechanism 8 may be performed through the phase difference AF and the contrast AF in combination.

Note that the image processing circuit 3 and the camera controller 10 may be configured to execute functions of respective sections by a processor such as an ASIC (Application Specific Integrated Circuit), FPGA (Field Programmable Gate Array) or the like, including a CPU (Central Processing Unit), for example, reading and executing a processing program stored in a storage apparatus such as a memory. However, the image processing circuit 3 and the camera controller 10 are not limited to the above-described configuration, but may be configured, for example, as dedicated electronic circuits configured to execute the functions of the respective sections.

Figure 2:
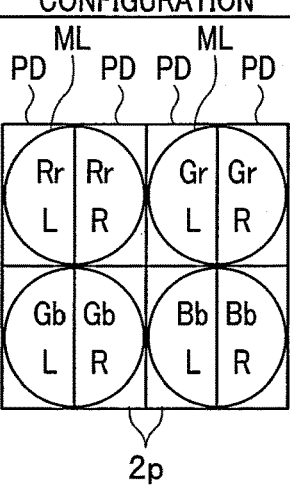
FIG. 2 is a chart showing examples of pixel divisional configurations of two-division and four-division and reading circuits therefor in an image sensor in the first embodiment.

FIG. 2 is a chart showing examples of each of pixel divisional configurations of two-division and four-division and the reading circuits 2b therefor in the image sensor 2.

The image sensor 2 includes the pixel region 2a in which a plurality of pixels 2p are two-dimensionally arranged in a unit of row. The pixel region 2a includes the plurality of pixels 2p arrayed in a row direction and a direction crossing the row direction. One example of the direction crossing the row direction is a direction (column direction) orthogonal to the row direction. However, the direction crossing the row direction is not limited to the above-described direction but may be a direction diagonally crossing the row direction (for example, an arrangement of honeycomb structure), or the like.

When n represents an integer of 2 or more, each of the plurality of pixels $2p$ provided in the image sensor 2 has one microlens ML, and n photoelectric conversion devices (photodetectors) PD. Note that a general optical lens is constituted of a plurality of lenses along an optical axis direction in some cases. Therefore, even in a case where the microlens ML is constituted of a plurality of lenses along the optical axis direction, the microlens ML is counted as one microlens ML.

The image sensor 2 outputs an image pickup signal related to n divisional pixel signals generated by photoelectrically converting the light from the microlens ML by n photoelectric conversion devices.

Here, the image pickup signal related to the n divisional pixel signals includes the n divisional pixel signals themselves, signals that can constitute the n divisional pixel signals, a pixel signal obtained by adding the n divisional pixel signals, or the like. The n divisional pixel signals themselves and the signals that can constitute the n divisional pixel signals are plurality of signals including phase difference information. The plurality of signals including the phase difference information outputted by the image sensor 2 can constitute a pixel signal.

Specifically, taking the case where one pixel is divided into two parts, i.e., L (left) and R (right), as an example, the n divisional pixel signals themselves include a divisional pixel signal L and a divisional pixel signal R (normal reading method). In addition, the signals that can constitute the n divisional pixel signals include a pixel signal (L+R) and the divisional pixel signal L, or the pixel signal (L+R) and the divisional pixel signal R (addition reading method). Furthermore, the pixel signal obtained by adding the n divisional pixel signals includes the pixel signal (L+R) from a 2PD region to be described later and a pixel signal ALL from a 1PD region to be described later.

The image sensor 2 is a color image sensor in which color filters of a plurality of filter colors are arranged as a repeat of a predetermined basic array. One filter color corresponds to one microlens ML. However, the image sensor 2 is not limited to the color image sensor but may be a monochrome image sensor.

The predetermined basic array of the image sensor 2 is, for example, a Bayer array of 2×2 pixels (such as a primary color Bayer array, a complementary color Bayer array), and the case of the primary color Bayer array of 2×2 pixels will be described below. However, the predetermined basic array is neither limited to the 2×2 pixels nor to the Bayer array.

The image sensor 2 is configured as a PD-division type image plane phase difference image sensor in which the pixel $2p$ is divided into a plurality of divisional pixels.

In the primary color Bayer array, vertical and horizontal 2×2 pixels are set as a basic array, and the basic array is periodically repeated in the row direction (horizontal direction) and the column direction (vertical direction). The basic array of the primary color Bayer array is composed of green filters Gr, Gb arranged at diagonal positions, a red filter Rr arranged on the same row as the green filter Gr, and a blue filter Bb arranged on the same row as the green filter Gb.

The green filter Gr and the green filter Gb have the same spectral characteristics but are discriminated from each other according to which of the red filter Rr and the blue filter Bb is arranged on the same row. Note that, in order to discriminate from R of right (R) and left (L), red as the filter color is denoted as Rr, and blue as the filter color is denoted as Bb in accordance with the way of denoting the red Rr as the filter color.

One pixel $2p$ includes a color filter of any one of the four filter colors Rr, Gr, Gb, and Bb, and one microlens ML. In a non-image-plane phase difference image sensor (or a light-shielding type image plane phase difference image sensor configured to acquire phase difference information by providing a structure (light-shielding film or the like) for shielding a part of pixel aperture), one photoelectric conversion device PD corresponds to one pixel. In contrast, the image sensor 2 according to the present embodiment is configured such that one pixel $2p$ includes n photoelectric conversion devices PD corresponding to the division number n of the pixel $2p$.

In addition, the plurality of pixels $2p$ provided in the image sensor 2 include normal pixels and OB (Optical Black) pixels as light-shielding pixels. Each of the OB pixels is a light-shielding pixel shielded by a light-shielding film or the like formed on the entire surface of the pixel aperture. The OB pixels are each configured such that the light from the microlens ML does not reach any of the plurality of photoelectric conversion devices in the pixel $2p$. Each of the normal pixels is a non-light-shielding pixel in which no light-shielding film is formed on the pixel aperture. The normal pixel is each configured such that the light from the microlens ML reaches all the plurality of photoelectric conversion devices in the pixel $2p$. As description will be made later with reference to FIG. 6, the pixel region $2a$ includes an effective region VReff composed of the normal pixels and an OB region (vertical OB region VOB and horizontal OB region HOB) (light-shielding region) composed of the OB pixels.

A first field in FIG. 2 shows an example in which one pixel $2p$ is divided into two parts, i.e., right (R) and left (L). Note that, in FIG. 2, the sets of horizontally arranged boxes of the chart are sequentially referred to as the first to third fields in the order from top to bottom.

Here, arrangement of the n photoelectric conversion devices PD for one microlens ML will be referred to as divisional arrangement. The divisional arrangement shown in the first field includes two types (n=2) of left (L) and right (R). RL divisional arrangement is suitable for a phase difference detection in the horizontal direction (what is called, a vertical line detection).

Two photoelectric conversion devices PD of the divisional arrangement, that is, a left-side photoelectric conversion device PDL and a right-side photoelectric conversion device PDR are provided for each pixel $2p$ of each of the filter colors Rr, Gr, Gb, and Bb. The photoelectric conversion devices PDL and PDR are configured, for example, as photodiodes and photoelectrically convert incident light to generate charges.

The photoelectric conversion devices PDL and PDR are connected to a floating diffusion FD respectively via transistors TrL and TrR that function as reading switches.

In such a configuration, when one or more of the transistors TrL and TrR are turned on, the charge of the photoelectric conversion device PD connected to the transistor Tr which has been turned on is transferred to the floating diffusion FD.

Therefore, when only one of the transistors TrL and TrR is turned on, the charge of only one of the photoelectric conversion devices PDL and PDR is transferred to the floating diffusion FD, and a divisional pixel signal L or a divisional pixel signal R can be read, as will be described later.

Furthermore, when the two transistors TrL and TrR are turned on, the charges of the photoelectric conversion devices PDL and PDR are transferred to the floating diffusion FD, that is, the charges of the two photoelectric conversion device PDL and PDR are added, and a normal (L+R) pixel signal can be read.

The floating diffusion FD and the transistors TrL and TrR are connected to a power-source voltage VDD via a transistor TrRES that functions as a reset switch. When the transistor TrRES is turned on, the floating diffusion FD is reset. Further, if the transistors TrL and TrR are turned on simultaneously, the respective photoelectric conversion devices PDL and PDR are also reset.

The floating diffusion FD is connected to a vertical signal line VSL via a transistor TrAMP and a transistor TrSEL. One end of the transistor TrAMP is connected to the power-source voltage VDD, and the other end of the transistor TrAMP is connected to a constant current circuit, not shown, via the transistor TrSEL. The transistor TrAMP functions as an amplifier circuit. The transistor TrSEL functions as a selection switch.

When the transistor TrSEL is turned on, a voltage value of the floating diffusion FD is amplified by the transistor TrAMP and read from the vertical signal line VSL.

Next, the second field in FIG. 2 shows an example in which one pixel 2p is divided into two parts, i.e., upper (U) and lower (D).

The divisional arrangement shown in the second field includes two types (n=2) of upper (U) and lower (D). UD divisional arrangement is suitable for a phase difference detection in the vertical direction (what is called, a horizontal line detection).

Two photoelectric conversion devices PD of divisional arrangement, that is, an upper photoelectric conversion device PDU and a lower photoelectric conversion device PDD are provided for each pixel 2p of each of the filter colors Rr, Gr, Gb, and Bb. The photoelectric conversion devices PDU and PDD are configured, for example, as photodiodes and photoelectrically convert incident light to generate charges.

Note that the reading circuit 2b is the same as in the case of the RL two-division except that LR is replaced with UD.

Therefore, when only one of the transistors TrU and TrD is turned on, a divisional pixel signal U or a divisional pixel signal D can be read.

On the other hand, when the two transistors TrU and TrD are turned on, the charges of the two photoelectric conversion device PDU and PDD are added, and the normal (U+D) pixel signal can be read.

Next, the third field in FIG. 2 shows an example in which one pixel 2p is divided into four parts, i.e., right (R), left (L), upper (U), and lower (D).

The divisional arrangement shown in the third field includes four types (n=4) of upper left (LU), upper right (RU), lower left (LD), and lower right (RD). The four-divisional arrangement is suitable for both the phase difference detection in the horizontal direction (what is called, the vertical line detection) and the phase difference detection in the vertical direction (what is called, the horizontal line detection).

Four photoelectric conversion devices PD of divisional arrangement, that is, an upper-left-side photoelectric conversion device PDLU, an upper-right-side photoelectric conversion devices PDRU, a lower-left-side photoelectric conversion device PDLD, and a lower-right-side photoelectric conversion device PDRD are provided for each pixel 2p of each of the filter colors Rr, Gr, Gb, and Bb. The photoelectric conversion devices PDLU, PDRU, PDLD, and PDRD are configured, for example, as photodiodes and photoelectrically convert incident light to generate charges.

The photoelectric conversion devices PDLU, PDRU, PDLD, and PDRD are connected to the floating diffusion FD respectively via transistors TrLU, TrRU, TrLD, and TrRD that function as reading switches.

In such a configuration, when one or more of the transistors TrLU, TrRU, TrLD, and TrRD are turned on, the charge of the photoelectric conversion device PD connected to the transistor Tr which has been turned on is transferred to the floating diffusion FD.

Therefore, when only one of the transistors TrLU, TrRU, TrLD, and TrRD is turned on, the charge of only one of the photoelectric conversion devices PDLU, PDRU, PDLD, and PDRD is transferred to the floating diffusion FD, and can be read as an LU divisional pixel signal, an RU divisional pixel signal, an LD divisional pixel signal, or an RD divisional pixel signal.

When two or more of the transistors TrLU, TrRU, TrLD, and TrRD are turned on, the charges of two or more of the photoelectric conversion devices PDLU, PDRU, PDLD, and PDRD are transferred to the floating diffusion FD, that is, the charges of two or more of the photoelectric conversion devices PD are added and can be read as divisional pixel signals.

Therefore, for example, execution of UD addition enables an L (LU+LD) divisional pixel signal and an R (RU+RD) divisional pixel signal to be read. The case where such a reading method is employed can be dealt with as the case where one pixel 2p is divided into two parts (n=2), that is, R and L.

In addition, for example, execution of RL addition enables a U (LU+RU) divisional pixel signal and a D (LD+RD) divisional pixel signal to be read. The case where such a reading method is employed can be dealt with as the case where one pixel 2p is divided into two parts (n=2), that is, U and D.

Furthermore, for example, execution of RLUD addition enables a normal (LU+RU+LD+RD) pixel signal to be read.

In addition, a divisional pixel signal obtained by adding three of the RLUD four division (specifically, LU+RU+LD, LU+RU+RD, LU+LD+RD, and RU+LD+RD) in the pixel 2p can be read.

The floating diffusion FD and the transistors TrLU, TrRU, TrLD, and TrRD are connected to the power-source voltage VDD via the transistor TrRES that functions as a reset switch. When the transistor TrRES is turned on, the floating diffusion FD is reset. Further, if the transistors TrLU, TrRU, TrLD, and TrRD are turned on simultaneously, the respective photoelectric conversion devices PDLU, PDRU, PDLD, and PDRD are also reset.

The floating diffusion FD is connected to the vertical signal line VSL via the transistor TrAMP and the transistor TrSEL. One end of the transistor TrAMP is connected to the power-source voltage VDD, and the other end of the transistor TrAMP is connected to the constant current circuit, not shown, via the transistor TrSEL. The transistor TrAMP functions as an amplifier circuit. The transistor TrSEL functions as a selection switch.

When the transistor TrSEL is turned on, the voltage value of the floating diffusion FD is amplified by the transistor TrAMP, and read from the vertical signal line VSL.

Note that description will be made below mainly on the example in which one pixel 2*p* is divided into two parts, i.e., L (left) and R (right).

The image sensor 2 which is the PD-division type image plane phase difference image sensor can operate in a first reading mode and a second reading mode. In the first reading mode, a pixel signal obtained by adding all the signals of the plurality of photoelectric conversion devices PD in each of the pixels 2*p* is read. In the second reading mode, a plurality of signals including phase difference information are read from the plurality of photoelectric conversion devices PD in each of the pixels 2*p*.

Reading the signals from all the rows in the pixel region 2*a* in the first reading mode is referred to appropriately as a video reading mode. In the first reading mode, the pixel signal which is the same as that in the state where one pixel 2*p* is configured by only one photoelectric conversion device PD (that is, pixel is not divided) is outputted. In the video reading mode, the pixel signal can be read in the same reading time as in the case where the pixel signal is read from a normal image sensor in which a pixel is not divided, but phase difference information cannot be acquired.

Figure 4:
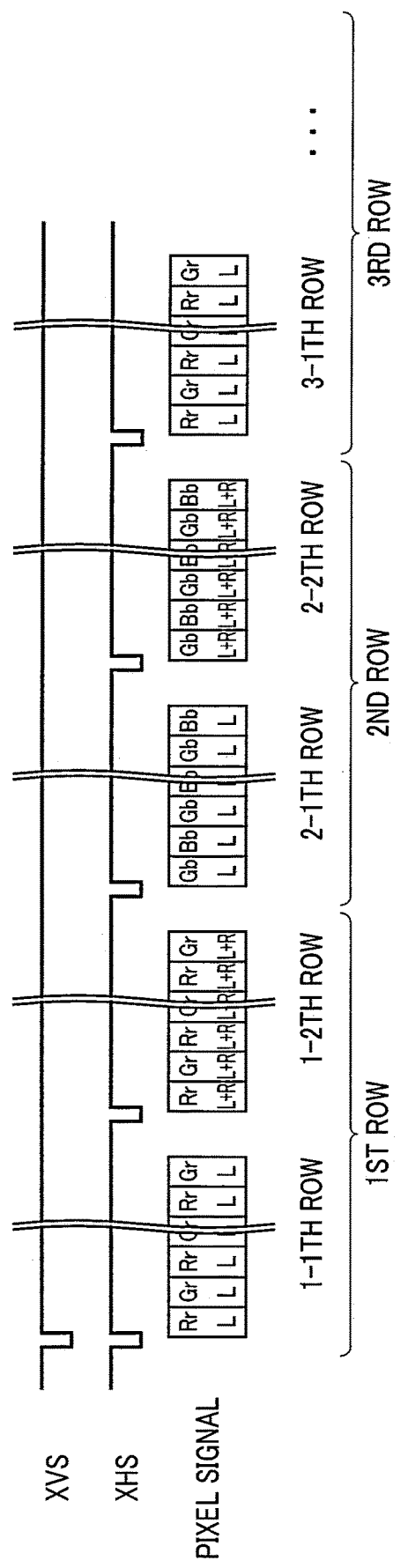
FIG. 4 is a timing chart showing an example in which signals are read, in the all-phase-difference reading mode, from the image sensor in the first embodiment.

In addition, reading the signals from all the rows in the pixel region 2*a* in the second reading mode is referred to appropriately as an all-phase-difference reading mode. FIG. 3 is a diagram showing an example of signals read, in the all-phase-difference reading mode, from the image sensor 2. FIG. 4 is a timing chart showing an example in which the signals are read, in the all-phase-difference reading mode, from the image sensor 2. Note that a character "F" illustrated in the pixel array in FIG. 3, and FIGS. 5 to 7, and FIG. 28 to be described later is just for reference to show whether the image is not inverted vertically and/or horizontally.

As described above, in the second reading mode, the divisional pixel signal L and the divisional pixel signal R may be read by the normal reading method. In this case, the phase difference information can be acquired as it is, but in order to generate a pixel signal, it is necessary to obtain (L+R) by adding the divisional pixel signals L and R. Therefore, the normal reading method is a reading method advantageous to the phase difference detection (priority for phase difference detection performance).

In contrast, in the examples shown in FIG. 3 and FIG. 4, the pixel signal (L+R) and the divisional pixel signal L are read by an addition reading method. In this case, the pixel signal (L+R) can be obtained as it is, but in order to generate phase difference information, it is necessary to calculate {(L+R)−L} by subtracting the divisional pixel signal L from the pixel signal (L+R). Therefore, the addition reading method is a reading method advantageous to image generation (priority for image quality). Note that, similarly, the addition reading method for reading the pixel signal (L+R) and the divisional pixel signal R is also a reading method advantageous to image generation.

In the examples shown in FIG. 3 and FIG. 4, from a 1st row in which the Rr pixels and the Gr pixels are arrayed in the pixel region 2*a*, the divisional pixel signals L are first read, as a 1-1th row, in synchronization with a horizontal synchronization signal XHS. Next, from the 1st row, the pixel signals (L+R) are read, as a 1-2th row, in synchronization with the horizontal synchronization signal XHS. Similarly, from the 2nd row in which the Gr pixels and the Bb pixels are arrayed, the divisional pixel signals L are read, as a 2-1th row, in synchronization with the horizontal synchronization signal XHS. Next, from the 2nd row, the pixel signals (L+R) are read, as a 2-2th row, in synchronization with the horizontal synchronization signal XHS. Such processing is performed to the last row. In addition, reading of the image of one frame is performed in synchronization with a vertical synchronization signal XVS.

The all-phase-difference reading mode takes, in the case of the two-division, the reading time which is about twice, and in the case of the four-division, the reading time which is about four times the reading time required for adding the divisional pixels to generate a pixel signal and reading the pixel signal, which lowers an image pickup rate. In addition, also energy consumption necessary for reading all the pixel signals for one frame from the image sensor 2 greatly increases.

Furthermore, the image sensor 2 according to the present embodiment enables the signals to be read in the first reading mode or the second reading mode for each row constituted of the plurality of pixels 2*p* arrayed in the row direction. The reading circuit 2*b* shown in FIG. 2 reads the signals from a first row (here, first row does not mean the above-described 1st row but means a certain row) in the pixel region 2*a* in the first reading mode and reads the signals from a second row (here, second row does not means the above-described 2nd row but means another row different from the certain row) in the second reading mode (that is, depending on the row, reading is performed in either the first reading mode or the second reading mode). Such a reading method is appropriately called the high-speed video phase difference reading mode.

In the high-speed video phase difference reading mode, the reading circuit 2*b* reads the signals from the first row of each of the vertical OB region VOB and the effective region VReff in the first reading mode and reads the signals from the second row of each of the vertical OB region VOB and the effective region VReff in the second reading mode. Hereinafter, the region composed of the first row to which the first reading mode is applied is referred to as the 1PD region, and the region composed of the second row to which the second reading mode is applied is referred to as the 2PD region.

In the high-speed video phase difference reading mode, by adjusting the ratio of the 1PD region and the 2PD region in the pixel region 2*a*, it is possible to acquire the phase difference information, while restricting the lowering of the image pickup rate. If 80% (40 rows out of 50 rows) of the pixel region 2*a* is supposed to be the 1PD region and 20% (10 rows out of 50 rows) of the pixel region 2*a* is supposed to be the 2PD region, for example, the reading time per one frame increases only by about 20%, compared with the video reading mode, and highly-accurate phase difference information can be acquired. The high-speed video phase difference reading mode is a mode effective especially in a live-view image shooting or a moving image shooting, in which a high frame rate is required. In addition, the energy consumption for reading all the pixel signals for one frame can be greatly reduced.

Note that the image sensor 2 according to the present embodiment can operate both in the above-described video reading mode and the all-phase-difference reading mode. However, hereinafter, description will be made on the case where the image sensor 2 operates in the high-speed video phase difference reading mode.

FIG. 5 is a diagram showing an example of signals read, in the high-speed video phase difference reading mode, from the image sensor 2.

In the example shown in FIG. 5, the 1st to 2nd rows and (p+2)-th to (p+3)-th rows are the 1PD region from which the signals are read in the first reading mode, and p-th to (p+1)-th rows and (last-1)-th to the last rows are 2PD region from which the signals are read in the second reading mode. Note that a pixel signal read by adding n divisional pixel signals from each pixel 2p in the 2PD region is referred to as (L+R), and a pixel signal read by adding n divisional pixel signals from each pixel 2p in the 1PD region is referred to as ALL, to distinguish from each other.

Figure 6:
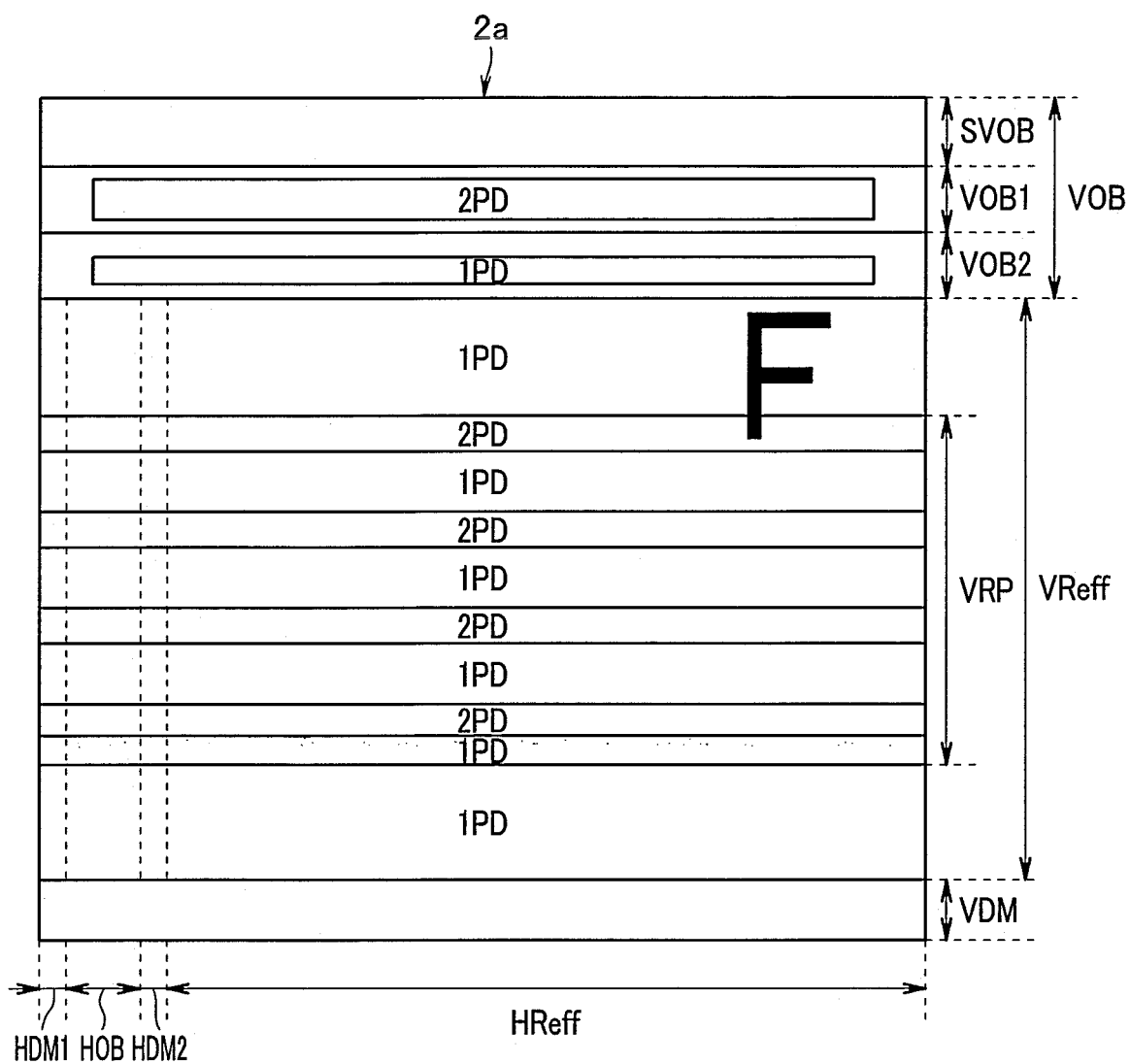
FIG. 6 is a diagram showing a configuration of the image sensor in the first embodiment and an operation example of the image sensor in the high-speed video phase difference reading mode.

FIG. 6 is a diagram showing the configuration of the image sensor 2 and the operation example of the image sensor 2 in the high-speed video phase difference reading mode. In FIG. 6, the horizontal direction is the row direction, and the vertical direction is the column direction.

The pixel region 2*a* includes, on the entirety thereof, a color filter in the Bayer array as described above. The pixel region 2*a* includes, in the following order from top to bottom, the vertical OB region VOB, the effective region VReff in which the normal pixels are arranged, and a dummy region VDM. The vertical OB region VOB includes, in the following order from top to bottom, a sensor clamp region SVOB, a first vertical OB region VOB1, and a second vertical OB region VOB2.

In addition, the pixel region 2*a* includes, in the following order from left to right, a first horizontal dummy region HDM1, the horizontal OB region HOB in which the light-shielded OB pixels are arranged, a second horizontal dummy region HDM2, and the effective region/execution region HReff in which the normal pixels are arranged.

In the case where the image sensor 2 operates in the high-speed video phase difference reading mode, signals are read from a part of the vertical OB region, for example, a first vertical OB region VOB1 in the second reading mode (2PD region), and signals are read from another part of the vertical OB region, for example, the second vertical OB region VOB2 in the first reading mode (1PD region). In the vertical OB region, a start row and an end row of the first vertical OB region VOB1 and a start row and an end row of the second vertical OB region VOB2 can be set as desired.

When detecting the OB level, it is neither necessary to use the entirety of the first vertical OB region VOB1 nor necessary to use the entirety of the second vertical OB region VOB2. For example, the OB level may be detected by using data in a rectangular region surrounding the "2PD" set in the first vertical OB region VOB1 and data in a rectangular region surrounding the "1PD" set in the second vertical OB region VOB2.

Furthermore, when the image sensor 2 operates in the high-speed video phase difference reading mode, a phase difference detection region VRP is set in the effective region VReff. In the effective region VReff, a start row and an end row of the phase difference detection region VRP can be set as desired. In addition, a plurality of phase difference detection regions VRP may be set in the effective region VReff. Therefore, setting a suitable phase difference detection region VRP for an AF area set according to an object enables the reading time of a frame image to be effectively reduced.

Then, in a region other than the phase difference detection region VRP in the effective region VReff, reading of the signals is performed in the first reading mode (1PD region), and in the phase difference detection region VRP, reading of the signals is performed for each pixel row in the first reading mode or the second reading mode. Therefore, in the phase difference detection region VRP, the 2PD region and the 1PD region are present alternately in the up/down direction.

Figure 7:
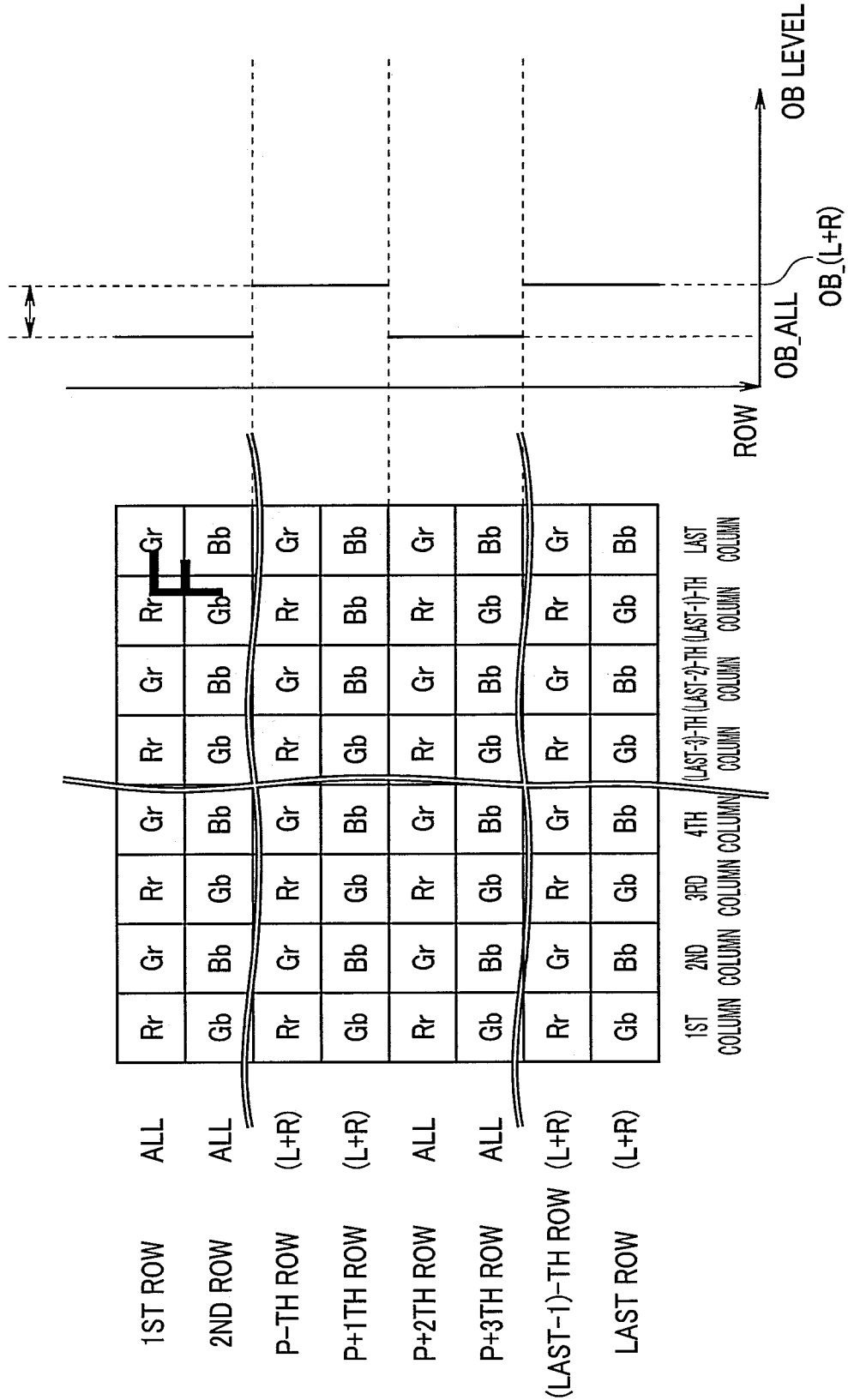
FIG. 7 is a diagram showing an example of RAW image data configured by "Bayerizing" signals which are obtained by image pickup with the image sensor being light shielded and read in the high-speed video phase difference reading mode, and an example of an offset of an OB level in the RAW image data in the first embodiment.
Figure 8:
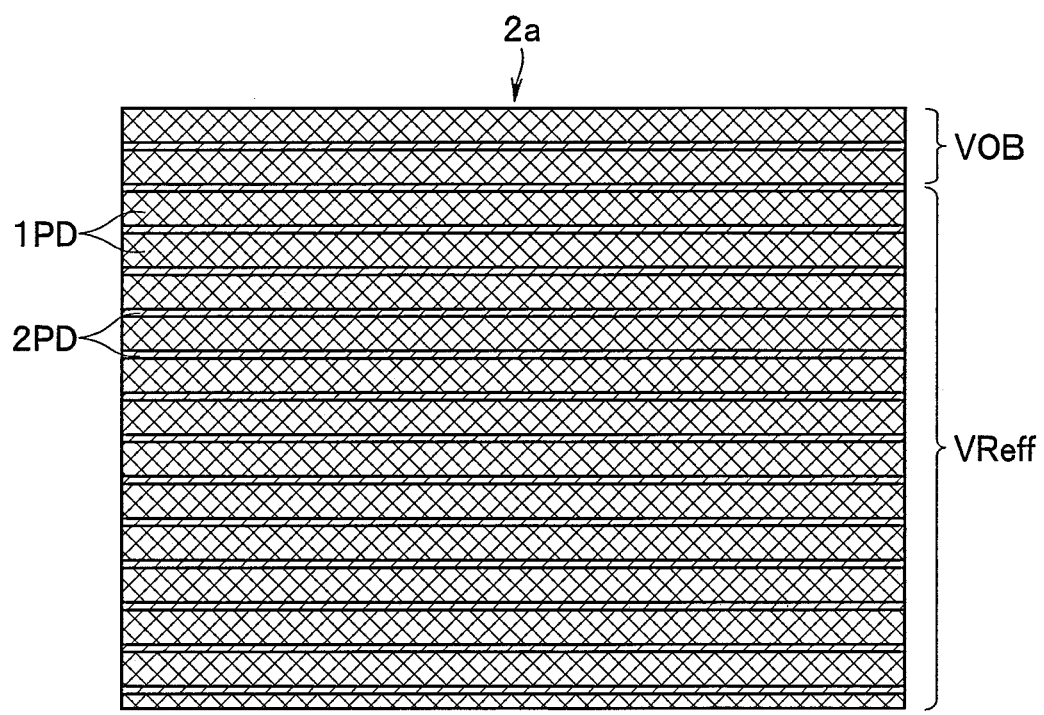
FIG. 8 is a diagram showing a state where horizontal streaks occur in the RAW image data configured by "Bayerizing" the signals which are obtained by the image pickup with the image sensor being light shielded and read in the high-speed video phase difference reading mode in the first embodiment.

FIG. 7 is a diagram showing an example of RAW image data configured by "Bayerizing" the signals which are obtained by image pickup with the image sensor 2 being light shielded and read in the high-speed video phase difference reading mode, and an example of an offset of the OB level in the RAW image data. FIG. 7 and FIG. 8 to be described later show the RAW image data in the state where the horizontal streak correction has not been performed by the horizontal streak correction circuit 3*b*.

Note that "Bayerizing" indicates that the RAW image data is configured by the pixel signal ALL read from the first row in the first reading mode and the pixel signal (L+R) obtained from the plurality of signals read from the second row in the second reading mode.

The OB clamp circuit 2*d* of the image sensor 2 performs processing on the OB level (OB clamp processing) such that the signal level of the light-shielding pixels detected in the sensor clamp region SVOB as a light-shielding region has a fixed value (in the case of 12-bit ADC, often set at, for example, 256 (LSB)), as a digital value.

When the pixel signal ALL is read from the 1PD region, the floating diffusion FD is reset and a reset signal for correlated double sampling (CDS) is read. After that, the charges of the photoelectric conversion device PDR and the photoelectric conversion device PDL are simultaneously transferred to the floating diffusion FD and read.

On the other hand, when the pixel signal (L+R) is read from the 2PD region, the floating diffusion FD is reset and the reset signal for correlated double sampling (CDS) is read, and then, for example, the charge of the photoelectric conversion device PDL is transferred to the floating diffusion FD and read. After that, the charge of the photoelectric conversion device PDR is transferred to the floating diffusion FD, without resetting the floating diffusion FD, and added to the charge of the photoelectric conversion device PDL and read.

Therefore, a first time interval from the reset of the floating diffusion FD until the pixel signal ALL in the 1PD region is read differs in time length from a second time interval from the reset of the floating diffusion FD until the pixel signal (L+R) in the 2PD region is read.

As a result, a difference is generated between the OB level OB_(L+R), which is caused by a dark current and the like, of the pixel signal (L+R) read from the 2PD region and the OB level OB_ALL, which is caused by the dark current and the like, of the pixel signal ALL read from the 1PD region. The dark current described here indicates the dark current generated in the floating diffusion FD. The difference in the reading timings, which appears in the difference between the first time interval until the pixel signal ALL is read and the second time interval until the pixel signal (L+R) is read, brings a difference in influences by power-source fluctuation on the pixel signal ALL and the pixel signal (L+R). Such a difference in the influences by the power-source fluctuation is one of big factors causing a difference between the OB level OB_(L+R) and the OB Level OB_ALL.

The graph shown on the right side of FIG. 7 shows the difference between the OB level OB_(L+R) and the OB level OB_ALL. Such a difference in the OB levels will be a cause of the horizontal streaks appearing on an image.

FIG. 8 is a diagram showing a state where the horizontal streaks occur in the RAW image data configured by "Bayerizing" the signals which are obtained by the image pickup with the image sensor 2 being light shielded and read in the high-speed video phase difference reading mode.

In the pixel region 2*a* including the vertical OB region VOB and the effective region VReff, the 1PD region of one or more rows and the 2PD region of one or more rows are set alternately. Therefore, the horizontal streaks due to the difference in the OB levels, as shown in FIG. 8, occur in the RAW image data acquired by the image pickup performed in the light-shielded state.

Therefore, the horizontal streak correction circuit 3b corrects the horizontal streaks in the RAW image data acquired in the high-speed video phase difference reading mode, by performing the processing as shown in (A1) to (A3) described below.

(A1) Calculation Processing of OB Level from Signal in Vertical OB Region VOB

The horizontal streak correction circuit 3b calculates an average value of the signals each read from the photoelectric conversion device PDL in each of the pixels 2p in the rectangular region (2PD region) set in the first vertical OB region VOB1, to obtain the OB level OB_L. Further, the horizontal streak correction circuit 3b calculates an average value of the signals each obtained by adding the signal of the photoelectric conversion device PDL and the signal of the photoelectric conversion device PDR in each of the pixels 2p in the rectangular region (2PD region) set in the first vertical OB region VOB1 and read, to obtain the OB level OB_(L+R). Furthermore, the horizontal streak correction circuit 3b calculates an average value of the signals each obtained by adding the signal of the photoelectric conversion device PDL and the signal of the photoelectric conversion device PDR in each of the pixels 2p in the rectangular region (1PD region) set in the second vertical OB region VOB2 and read, to obtain the OB level OB_ALL. As described above, the OB level OB_(L+R) acquired from the 2PD region and the OB level OB_ALL acquired from the 1PD region are discriminated from each other. Note that the calculations of the OB level OB_(L+R) and the OB level OB_ALL are performed for each of the filter colors.

(A2) Addition Processing of Left and Right Divisional Pixel Signals in Vertical OB Region VOB In the addition reading method of reading the pixel signal (L+R) and the divisional pixel signal L, the processing for adding the signal of the photoelectric conversion device PDL and the signal of the photoelectric conversion device PDR in the 2PD region is performed in the image sensor 2. Therefore, the horizontal streak correction circuit 3b does not have to perform addition processing for generating the RAW image data in the Bayer array, but has only to select the OB level OB_(L+R), which is the average value of the signals each obtained by adding the signals of the left and right photoelectric conversion devices, outputted from the 2PD region in the vertical OB region VOB.

(A3) Addition Processing of Left and Right Divisional Pixel Signals in Effective Region VReff The horizontal streak correction circuit 3b performs an arithmetic operation of (Equation 1) on each of the pixels 2p in the 2PD region in the phase difference detection region VRP set in the effective region VReff, to obtain an arithmetic operation result Sum.

$$Sum=\{(L+R)-OB\_(L+R)\}+OB\_All \qquad \text{(Equation 1)}$$

Here, (L+R) is the pixel signal obtained from the plurality of signals read from the second row of the effective region VReff. OB_ALL is the pixel signal read from the first row of the light-shielding region (here, the vertical OB region VOB). OB_(L+R) is one of the plurality of signals read from the second row of the light-shielding region.

(Equation 1) indicates execution of the following processing. In other words, in the addition reading method as the second reading mode, the normal pixel signal (L+R) read from the normal pixel is extracted, and then the OB pixel signal OB_(L+R) read from the OB pixel is extracted. Then, the OB pixel signal OB_(L+R) is subtracted from the normal pixel signal (L+R), to generate a provisional OB subtraction pixel signal {(L+R)−OB_(L+R)}. Further, the OB pixel signal OB_ALL read from the OB pixel in the first reading mode is added to the provisional OB subtraction pixel signal {(L+R)−OB_(L+R)}, to generate the arithmetic operation result Sum as pixel data.

Thus, the processing for matching the OB level included in the normal pixel signal (L+R) in the 2PD region with the OB level of the normal pixel signal ALL in the 1PD region. With such processing, the horizontal streak correction circuit 3b suppresses the occurrence of the horizontal streaks due to the difference in the OB levels.

In (Equation 1), correction processing is performed on the pixel signal (L+R) obtained from the plurality of signals read from the second row of the effective region VReff. Alternatively, correction processing may be performed on the pixel signal ALL read from the first row of the effective region VReff. In such a case, an equation corresponding to (Equation 1) is (Equation 1') shown below in which an arithmetic operation result of the pixel data is indicated as Sal, instead of Sum.

$$Sal=\{(ALL)-OB\_ALL\}+OB\_(L+R) \qquad \text{(Equation 1')}$$

(Equation 1') indicates matching the OB level included in the normal pixel signal ALL in the 1PD region with the OB level of the normal pixel signal (L+R) in the 2PD region. The horizontal streak correction circuit 3b may suppress the occurrence of the horizontal streaks due to the difference in the OB levels by performing the processing of (Equation 1') instead of the processing of (Equation 1).

Such a first offset correction method of dynamically correcting the horizontal streaks for each frame by using the OB level in the vertical OB region VOB is referred to as a VOB method.

Note that a value of the OB level is typically slightly different for each color (Rr, Gr, Gb and Bb) of Bayer. The colors of Bayer are generated by the color filters, and thus, there is no difference in an actual pixel circuit and the OB clamp circuit 2d themselves even if the colors are different. However, if the colors are different, locations where the pixel circuit and the OB clamp circuit 2d are disposed are different, which leads to a difference in a wiring route (such as a wiring location and a wiring length) to the pixel circuit and a difference in a wiring route of power source feeding to the above-described circuits, and thus, a difference in the OB levels occurs due to these differences.

In view of the above, the horizontal streak correction circuit 3b performs the above-described correction processing for matching the OB levels for each of the filter colors of the pixels 2p by discriminating the filter colors (this is not applied to a case where the difference in the OB levels depending on the filter colors can be ignored).

In addition, the horizontal streak correction by the horizontal streak correction circuit 3b is performed simultaneously with the processing for generating the RAW image data in the Bayer array as shown in FIG. 7 from the image data read, as shown in FIG. 5, in the high-speed video phase difference reading mode.

Figure 9:
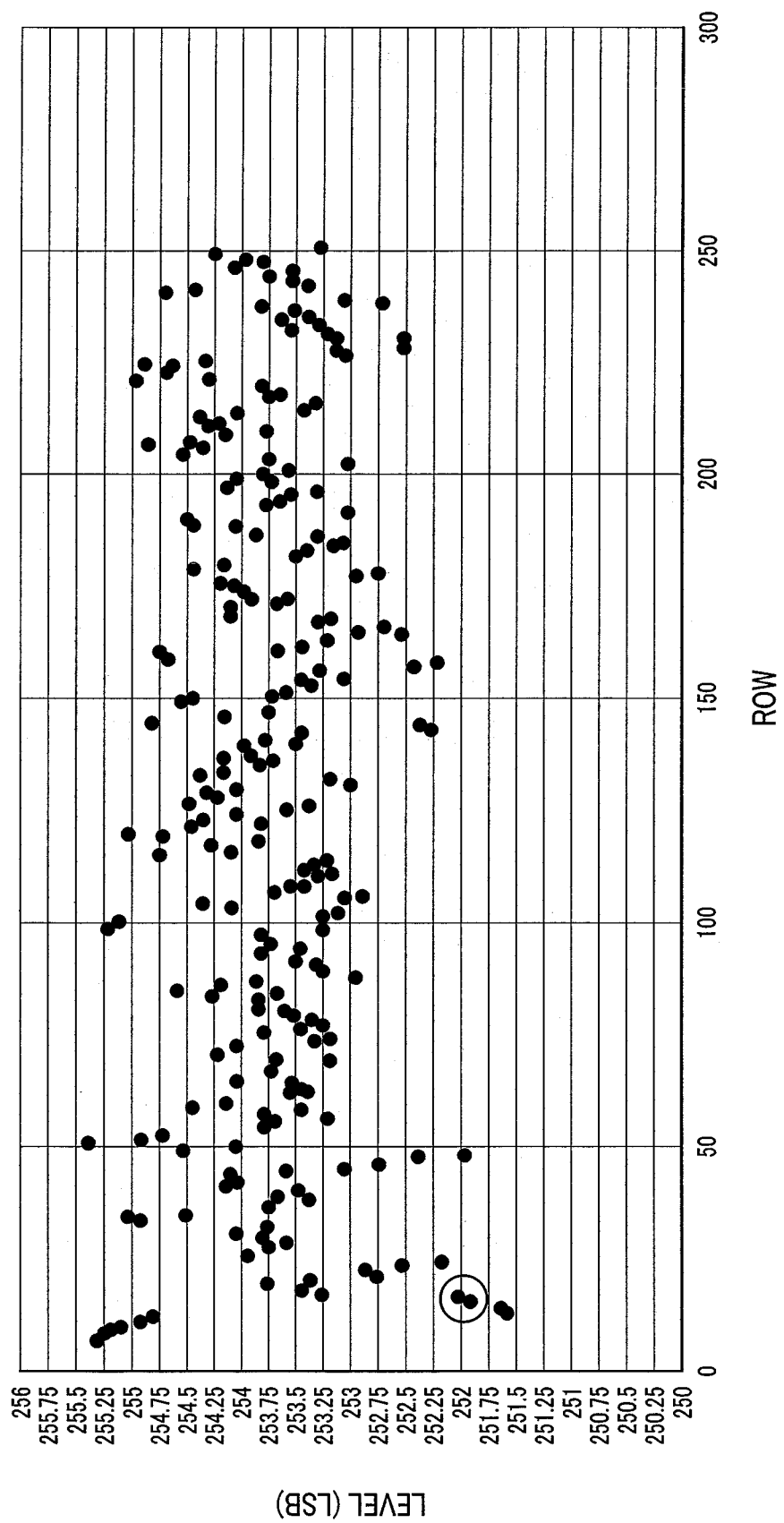
FIG. 9 is a diagram showing a distribution of average values of OB levels OB_(L+R) of Gr (green) pixels for respective rows in a 2PD region in an image of one frame, which is picked up with the image sensor being light shielded, in the first embodiment.

FIG. 9 is a diagram showing a distribution of average values of the OB levels OB_(L+R) of the Gr pixels for respective rows in the 2PD region in the image of one frame, which is picked up with the image sensor 2 being light shielded. Note that, in FIG. 9 and FIG. 10 to be described later, values are plotted, with the row numbers in the image as the horizontal axis and the level (average value of the pixel signal levels in one row (for example, for 2000 columns) as the vertical axis.

Figure 10:
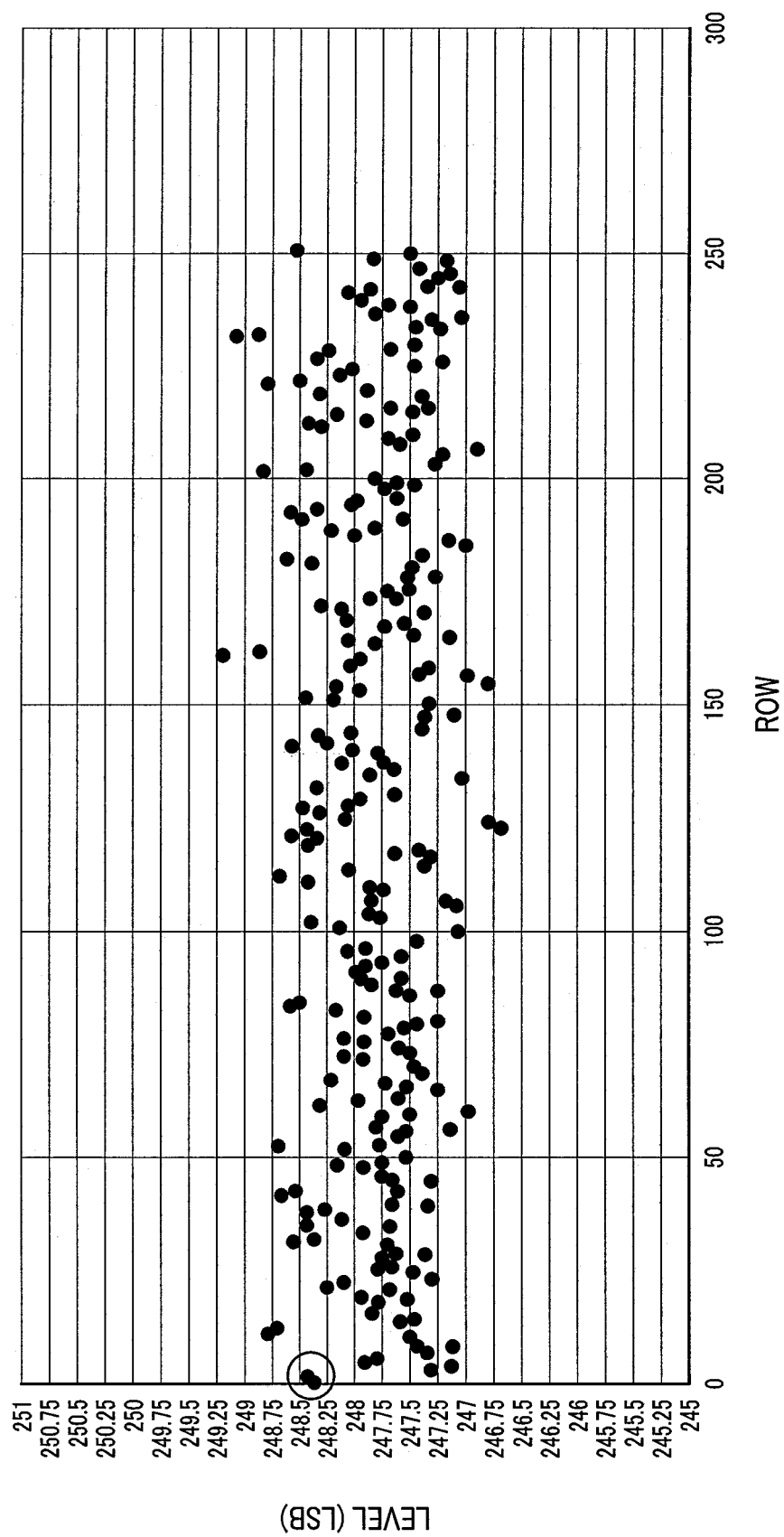
FIG. 10 is a diagram showing a distribution of average values of OB levels OB_ALL of Gr pixels for respective rows in a 1PD region in the image of one frame, which is picked up with the image sensor being light shielded, in the first embodiment.

FIG. 9 and FIG. 10 show the data in the case where two rows in which the Rr pixels and the Gr pixels are arrayed and two rows in which the Gb pixels and the Bb pixels are arrayed are provided in the first vertical OB region VOB1 where the rectangular region (2PD region) is set, and similarly, two rows in which the Rr pixels and the Gr pixels are arrayed and two rows in which the Gb pixels and the Bb pixels are arrayed are provided in the second vertical OB region VOB2 where the rectangular region (1PD region) is set. FIG. 9 and FIG. 10 show, as one example, the OB levels OB_(L+R) of the Gr pixels related to the filter color Gr.

The average value of the OB level OB_(L+R) of the entire image of one frame shown in FIG. 9 is about 253.75 (LSB). In contrast, the per-row average value of the OB level OB_(L+R) varies row by row.

The two dots in the encircled part in FIG. 9 show the per-row average value of the OB level OB_(L+R) in the rectangular region (2PD region) set in the first vertical OB region VOB1, for two rows. The average value is about 252 (LSB). Therefore, 252 (LSB) is lower than the average value 253.75 (LSB) of the entire image by about 1.75 (LSB). To what extent the OB levels OB_(L+R) acquired from the vertical OB region VOB vary with respect to the average OB level of the entire image differs for each frame (that is, every time image pickup is performed).

FIG. 10 is a diagram showing a distribution of the average values of the OB levels OB_ALL of the Gr pixels for the respective rows in the 1PD region in the image of one frame, which is picked up with the image sensor 2 being light shielded.

The average value of the OB level OB_ALL of the entire image of one frame shown in FIG. 10 is about 247.75 (LSB). In contrast, the per-row average value of the OB level OB_ALL varies row by row.

The two dots in the encircled part in FIG. 10 show the per-row average value of the OB level OB_ALL in the rectangular region (1PD region) set in the second vertical OB region VOB2, for two rows. The average value is about 248.4 (LSB). Therefore, 248.4 (LSB) is higher than the average value 247.75 (LSB) of the entire image by about 0.65 (LSB). To what extent the OB levels OB_ALL acquired from the vertical OB region VOB vary with respect to the average OB level of the entire image differs for each frame.

As described above, the OB levels OB_(L+R) and OB_ALL, which are acquired from the vertical OB region VOB, vary with respect to the average value of the OB level of the entire image. Furthermore, such variations differ for each frame. If the horizontal streak correction circuit 3b corrects the horizontal streaks in the effective region VReff based on the OB levels OB_(L+R) and OB_ALL that have such variations, variation for each frame arises also in the result after the correction. Such a variation for each frame is referred to as a repetitive variation below, as appropriate.

In the examples shown in FIG. 9 and FIG. 10, the average value of the OB level OB_(L+R) of the entire image is 253.75 (LSB) and the average value of the OB level OB_ALL of the entire image is 247.75 (LSB). Therefore, based on (Equation 1), the actual correction amount of (L+R) is {OB_(L+R)−OB_ALL}=253.75−247.75=6.0 (LSB).

On the other hand, the average value of the OB level OB_(L+R) acquired from the first vertical OB region VOB1 is 252 (LSB) and the average value of the OB level OB_ALL obtained from the second vertical OB region VOB2 is 248.4 (LSB). Then, the correction amount of (L+R) based on (Equation 1) is {OB_(L+R)−OB_ALL}=252−248.4=3.6 (LSB).

Thus, if the correction using the VOB method is performed in the examples shown in FIG. 9 and FIG. 10, the correction is not sufficient, and horizontal streaks remain. In addition, the correction amount {OB_(L+R)−OB_ALL} obtained from the vertical OB region VOB varies for each frame.

Figure 11:
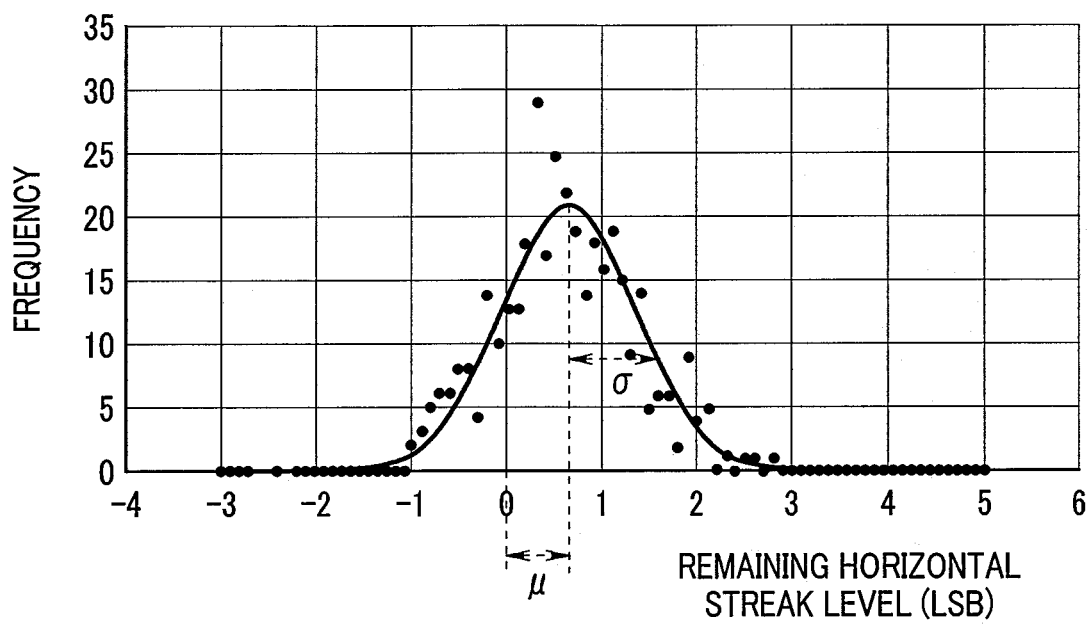
FIG. 11 is a graph showing a frequency of a remaining horizontal streak level in an effective region VReff of an image in which horizontal streaks are corrected by the VOB method and which is "Bayerized" in the first embodiment.

FIG. 11 is a graph showing a frequency of the remaining horizontal streak level in the effective region VReff of the image in which horizontal streaks are corrected by the VOB method and which is Bayerized. FIG. 11 shows the frequency of offset values (remaining horizontal streak level) of the OB levels OB_ALL and the OB levels OB_(L+R) after the horizontal streaks are corrected by the VOB method in the effective region VReff in the images for 368 frames acquired with the image sensor 2 being light shielded. Note that FIGS. 11 and 12 each show the result of fitting the frequencies obtained as actual measurement values to the normal distribution.

The OB levels OB_(L+R) and OB_ALL acquired from the vertical OB region VOB, as average values for two rows, for example, vary for each frame. As a result, also the remaining horizontal streak level varies for each frame. In the example shown in FIG. 11, the remaining horizontal streak levels in the images for 368 frames have the average value μ=0.65 (LSB) and the standard deviation σ=0.71 (LSB). Note that the average value μ and the standard deviation σ change roughly in proportion to an amplification factor of a signal.

In order to reduce the variations (random variations) for each frame of the OB levels OB_(L+R) and OB_ALL acquired from the vertical OB region VOB, the number of rows of the vertical OB region VOB may be increased (for example, in order to reduce the variations of the OB levels to be equal to or smaller than 1 (LSB), the number of rows may be increased considerably more than several rows). However, in such a case, the chip size of the image sensor 2 increases, which results in a rise of the unit price of the image sensor 2. In addition, the image pickup rate decreases by the increased number of rows, and also the energy consumption necessary for reading all the data for one frame increases.

In addition, there is a case where mix reading for mixing a plurality of pixel signals of the same color and reading the mixed pixel signals from the image sensor 2. The mix reading is used, for example, for the live-view image shooting in which the number of pixels may be smaller than that in the image for recording. If a plurality of pixel signals of the same color, which are adjacent to one another in the column direction, are mixed by using the mix reading, the number of rows from which the pixel signals are read decreases compared with the case where all the pixel signals are read. In order to reduce the variations of the OB levels OB_(L+R) and OB_ALL for each frame, while addressing the mix reading in which the number of rows decreases, it is necessary to further increase the number of rows provided in the vertical OB region VOB.

In view of the above, the horizontal streak correction circuit 3b of the present embodiment is configured to be capable of using not only the first offset correction method (VOB method) of the horizontal streaks based on the OB levels acquired from the vertical OB region VOB, but also a second offset correction method (hereinafter, referred to as an adjusting method) based on a value determined in advance. The horizontal streak correction circuit 3b selects, as the horizontal streak correction method, either the VOB method or the adjusting method, according to the parameters (the specific examples of the parameters will be described later) for the image processing to be performed by the image processing circuit 3, to correct the horizontal streaks.

In the adjusting method, an environmental temperature of the image sensor 2 is set to a predetermined temperature in an adjusting process (for example, an adjusting process in a factory at the time of product shipment, or an adjusting process to be performed by a user by setting a calibration mode after the shipment). Then, an image or images of one or more frames are acquired with the image sensor 2 being light shielded, and an OB level Comp_(L+R)_ALL_Offset (value determined in advance) is calculated for each of the filter colors by using the signals in the effective region VReff of the acquired image or images.

Specifically, in the adjusting process, the average value of the signals each obtained by adding the signal of the photoelectric conversion device PDL and the signal of the photoelectric conversion device PDR in each of the pixels $2p$ in the 2PD region in the effective region VReff and read, is calculated to obtain the OB level Comp_(L+R).

Furthermore, in the adjusting process, the average value of the signals each obtained by adding the signal of the photoelectric conversion device PDL and the signal of the photoelectric conversion device PDR in each of the pixels $2p$ in the 1PD region in the effective region VReff and read, is calculated to obtain the OB level Comp_ALL.

Then, in the adjusting process, the OB level Comp_(L+R)_ALL_Offset to be used in the adjusting method is calculated based on (Equation 2).

$$\text{Comp\_}(L+R)\text{\_ALL\_Offset=Comp\_}(L+R)\text{-Comp\_ALL} \quad \text{(Equation 2)}$$

Since the number of rows in the effective region VReff is larger than that in the vertical OB region VOB, the calculated OB level Comp_(L+R)_ALL_Offset has an extremely small variation for each frame.

The horizontal streak correction circuit $3b$ uses the OB level Comp_(L+R)_ALL_Offset thus calculated to perform an arithmetic operation of (Equation 3) in the adjusting method, to thereby obtain an arithmetic operation result Sum.

$$\text{Sum=}(L+R\text{-Comp\_}(L+R)\text{\_All\_Offset}) \quad \text{(Equation 3)}$$

In (Equation 3), correction processing is performed on the pixel signal (L+R) obtained from the plurality of signals read from the second row of the effective region VReff. Similarly, as described in the correction using the VOB method, the correction processing may be performed on the pixel signal ALL read from the first row of the effective region VReff. In such a case, an equation corresponding to (Equation 3) is (Equation 3') shown below in which the arithmetic operation result of the pixel data is indicated as Sal, instead of Sum.

$$\text{Sal=(ALL+Comp\_}(L+R)\text{\_ALL\_Offset)} \quad \text{(Equation 3')}$$

Figure 12:
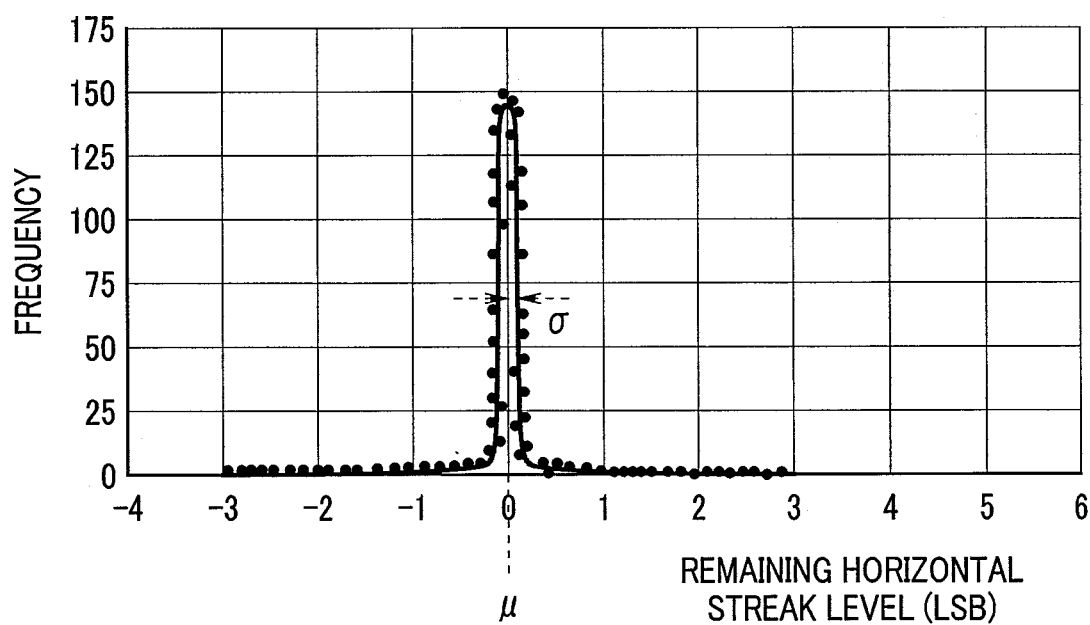
FIG. 12 is a graph showing a frequency of a remaining horizontal streak level in the effective region VReff of an image in which horizontal streaks are corrected by an adjusting method and which is "Bayerized" in the first embodiment.

In calculating the OB level Comp_(L+R)_ALL_Offset to be used in the adjusting method, it is not necessary to use all the rows in the effective region VReff, but only the appropriate number of rows larger than that in the vertical OB region VOB may be used. Since the appropriate number of rows to be used for the calculation depends on the number of pixels of the image sensor 2, the cycle indicating every how many rows the 2PD region and the 1PD region are repeated, and the like, it is difficult to generalize the appropriate number of rows to be used for the calculation but may be 100 rows as one example. FIG. 12 shows an example in which the standard deviation σ of the repetitive variations is made small by calculating the OB level Comp_(L+R)_Al-l_Offset with high accuracy by using data for 100 rows, for example.

FIG. 12 is a graph showing a frequency of the remaining horizontal streak level in the effective region VReff of the image in which horizontal streaks are corrected by the adjusting method and which is Bayerized. FIG. 12 shows the frequency of the offset values (the remaining horizontal streak level) of the OB levels OB_ALL and the OB levels OB_(L+R) after performing the correction of the horizontal streaks by the adjusting method in the effective region VReff of the images for 368 frames which is the same number as that in FIG. 11.

The OB level Comp_(L+R)_ALL_Offset to be used in the adjusting method substantially coincides with the average OB level of the entire image. Therefore, the remaining horizontal streak level in the images for 368 frames has an average value of $\mu=0$ (LSB). In addition, since there is no variation in the OB levels in the vertical OB region VOB for each frame unlike in the case of the VOB method, the horizontal streak correction is performed stably, with the standard deviation $\sigma=0.1$ (LSB). Therefore, the remaining horizontal streak level in the adjusting method shown in FIG. 12 is smaller than that in the VOB method shown in FIG. 11. Thus, it is understood that highly-accurate horizontal streak correction is performed.

However, since the adjusting method uses the fixed value acquired in the adjusting process, the adjusting method cannot address the change in the OB levels due to the change in the environmental temperature. In contrast, since the VOB method is a method of dynamically performing the correction for each frame, the VOB method can address the change in the OB levels due to the change in the environmental temperature.

Figure 13:
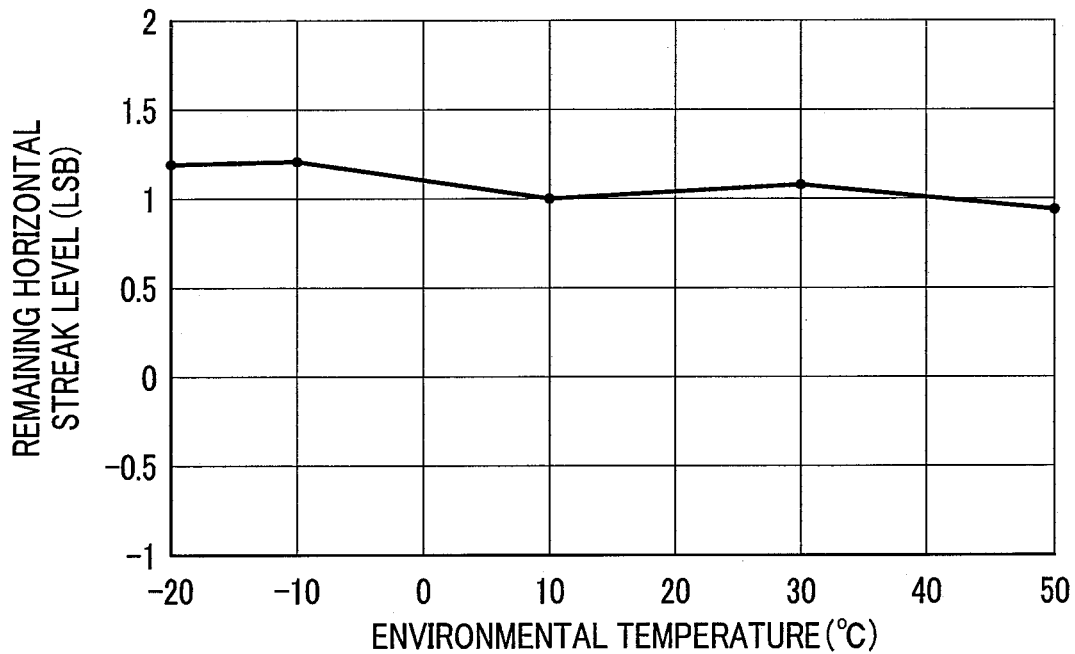
FIG. 13 is a graph showing an example of a change in a remaining horizontal streak level of Gr pixels, according to an environmental temperature, when image pickup is performed by setting an ISO sensitivity to 12800 and the horizontal streaks are corrected by the VOB method in the first embodiment.

FIG. 13 is a graph showing an example of a change in the remaining horizontal streak level of the Gr pixels according to the environmental temperature, when image pickup is performed by setting the ISO sensitivity to 12800 and the horizontal streaks are corrected by the VOB method. The unit of the environmental temperature shown on the horizontal axis in each of FIG. 13 to FIG. 16 is "° C.". The remaining horizontal streak level shown in each of FIG. 13 to FIG. 16 indicates the average value in a plurality of frames (average value μ shown in each of FIG. 11 and FIG. 12). Furthermore, FIG. 13 to FIG. 16 show the example of the Gr pixels to avoid complicating the drawings. Also, Gb, Rr, and Bb pixels each show a similar tendency as that of Gr pixels, although there are some differences in values.

In the VOB method with the ISO sensitivity set to 12800, there are remaining horizontal streaks the level of which is about 1 (LSB). If the environmental temperature increases, the remaining horizontal streak level tends to decrease slightly. However, the level is stable in general. The remaining horizontal streak level is about 1.2 (LSB) at −20° C., and about 0.9 (LSB) at 50° C. Therefore, the change in the remaining horizontal streak level within the environmental temperature range shown in FIG. 13 is about 0.3 (LSB).

Figure 14:
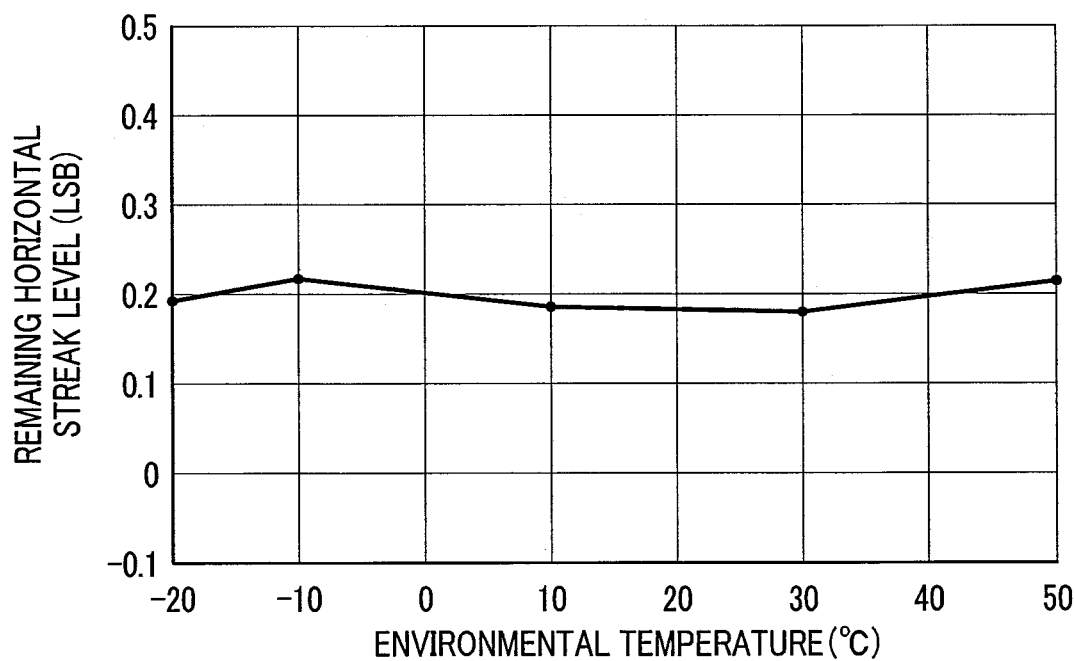
FIG. 14 is a graph showing an example of a change in the remaining horizontal streak level of the Gr pixels, according to the environmental temperature, when image pickup is performed by setting the ISO sensitivity to 1600 and the horizontal streaks are corrected by the VOB method in the first embodiment.

FIG. 14 is a graph showing an example of a change in the remaining horizontal streak level of the Gr pixels according to the environmental temperature, when image pickup is performed by setting the ISO sensitivity to 1600 and the horizontal streaks are corrected by the VOB method.

In the VOB method with the ISO sensitivity set to 1600, the remaining horizontal streak level decreases to about 0.2 (LSB) and changes slightly according to the change in the environmental temperature. However, the level is stable in general. The remaining horizontal streak level is about 0.18 (LSB) at 30° C., and about 0.22 (LSB) at 50° C. Therefore, the change in the remaining horizontal streak level within the environmental temperature range shown in FIG. 14 is about 0.04 (LSB).

Figure 15:
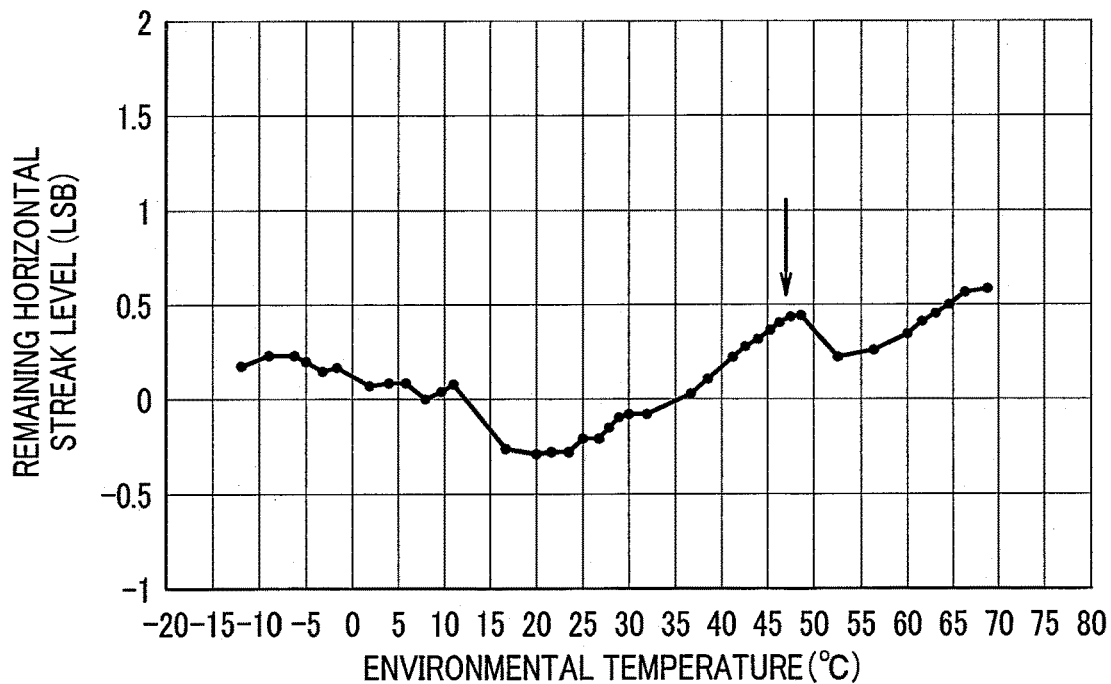
FIG. 15 is a graph showing an example of a change in the remaining horizontal streak level of the Gr pixels, according to the environmental temperature, when image pickup is performed by setting the ISO sensitivity to 12800 and the horizontal streaks are corrected by the adjusting method in the first embodiment.
Figure 16:
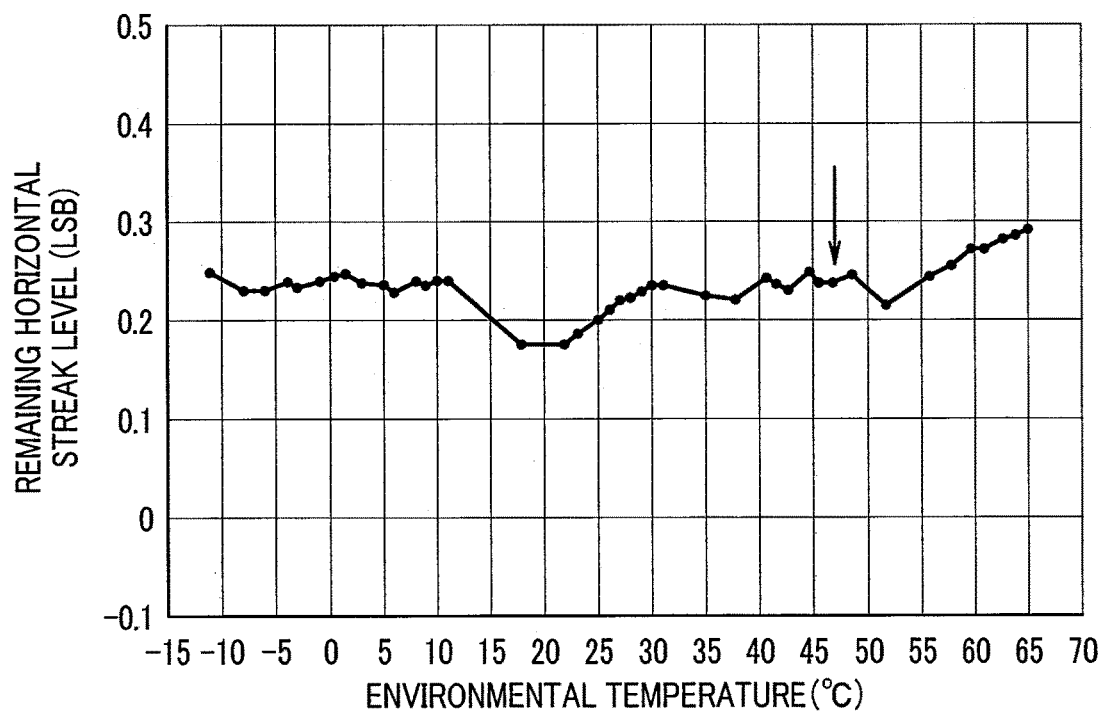
FIG. 16 is a graph showing an example of a change in the remaining horizontal streak level of the Gr pixels, according to the environmental temperature, when image pickup is performed by setting the ISO sensitivity to 1600 and the horizontal streaks are corrected by the adjusting method in the first embodiment.

FIG. 15 is a graph showing an example of a change in the remaining horizontal streak level of the Gr pixels according to the environmental temperature, when image pickup is performed by setting the ISO sensitivity to 12800 and the horizontal streaks are corrected by the adjusting method. Note that the arrows in FIG. 15 and FIG. 16 show the environmental temperature (adjusting condition) set in the adjusting process, which is about 47° C. About 47° C. is a typical value of the environmental temperature of the image sensor 2 when at least a certain time period has passed after turning on the power source of the image pickup apparatus.

In the adjusting method with the ISO sensitivity set to 12800, the remaining horizontal streak level shows a tendency to decrease at a temperature from −12° C. to about 20° C., and shows a tendency to increase according to the temperature when the temperature becomes higher than 20° C. The remaining horizontal streak level is about −0.3 (LSB) at 20° C., and about 0.6 (LSB) at 68° C. The change in the remaining horizontal streak level is 0.9 (LSB).

Thus, in the adjusting method shown in FIG. 15, the stability of the remaining horizontal streak level against the change in the environmental temperature is lower than that in the VOB method (level change: 0.3 (LSB)) shown in FIG. 13. In addition, the adjusting method shown in FIG. 15 shows a tendency that the remaining horizontal streak level irregularly fluctuates, compared with the VOB method shown in FIG. 13.

In each of the examples shown in FIG. 15 and FIG. 16, the remaining horizontal streak level slightly deviates from the ideal level of 0.0 (LSB) at 47° C. which is the environmental temperature as the adjusting condition. Such a deviation is caused by the measurement having been performed under the conditions different from those in the actual adjusting process when each of the data in FIG. 15 and FIG. 16 is acquired.

In other words, in the actual adjusting process, the environmental temperature is determined by a temperature determined by an indoor air conditioning in the process and a temperature increase around the image sensor 2 due to the self-heating by the driving of the image sensor 2. In contrast, when the data of FIG. 15 and FIG. 16 are acquired, the environmental temperature is controlled in a thermostatic chamber. Therefore, the data of FIG. 15 and FIG. 16 are acquired by the measurement under the conditions that the self-heating due to the driving of the image sensor 2 has little effect on the environmental temperature. The above-described deviation from 0.0 (LSB) is generated by the difference in how to manage the environmental temperature. Thus, the deviation from 0.0 (LSB) at 47° C. shows how sensitively the adjusting method depends on the environmental temperature and the like.

FIG. 16 is a graph showing an example of a change in the remaining horizontal streak level of the Gr pixels according to the environmental temperature, when image pickup is performed by setting the ISO sensitivity to 1600 and the horizontal streaks are corrected by the adjusting method.

In the adjusting method with the ISO sensitivity set to 1600, the remaining horizontal streak level shows the tendency to decrease at a temperature from −12° C. to about 20° C., and shows the tendency to increase according to the temperature when the temperature becomes higher than 20° C. The remaining horizontal streak level is about 0.18 (LSB) at 20° C., and about 0.29 (LSB) at 65° C. The change in the remaining horizontal streak level is 0.11 (LSB). Thus, in the adjusting method shown in FIG. 16, a degree of stability is higher than that in the adjusting method with the ISO sensitivity set to 12800 shown in FIG. 15, but the stability against the change in the environmental temperature is lower than that in the VOB method (level change: 0.04 (LSB)) at the same ISO sensitivity of 1600 shown in FIG. 14. In addition, the adjusting method shown in FIG. 16 shows a tendency that the remaining horizontal streak level irregularly fluctuates, compared with the VOB method shown in FIG. 14.

FIG. 17 is a chart showing the tendencies of the repetitive variation for each frame and the adaptability to the change in the temperature in each of the VOB method and the adjusting method.

As described above, in the VOB method, there is an error in the offset value {OB_(L+R)−OB_ALL} to be used for the horizontal streak correction, due to the influence of the random fluctuation of the row-averaged OB level. Therefore, the repetitive variation for each frame is larger in the VOB method shown in FIG. 11 than in the adjusting method shown in FIG. 12. From the viewpoint of the repetitive variation, the VOB method is disadvantageous, and the adjusting method is advantageous.

In addition, the VOB method of dynamically performing the correction, as shown in FIG. 13 and FIG. 14, is hardly influenced by the change in the environmental temperature, and exhibits a high stability, compared with the adjusting method shown in FIG. 15 and FIG. 16. In contrast, in the adjusting method, the remaining horizontal streak level is relatively low at the environmental temperature, which is the same as the adjusting condition, but the remaining horizontal streak level shows the tendency to fluctuate irregularly at a value equal to or lower than 1 (LSB) at the environmental temperature which is different from the adjusting condition. Therefore, from the viewpoint of the temperature dependency, the VOB method is advantageous, and the adjusting method is disadvantageous.

Description has been mainly made above on the remaining horizontal streak level in the RAW image. Next, description will be made on how the remaining horizontal streaks look like when the RAW image subjected to the image processing is displayed on the display 4.

Figure 18:
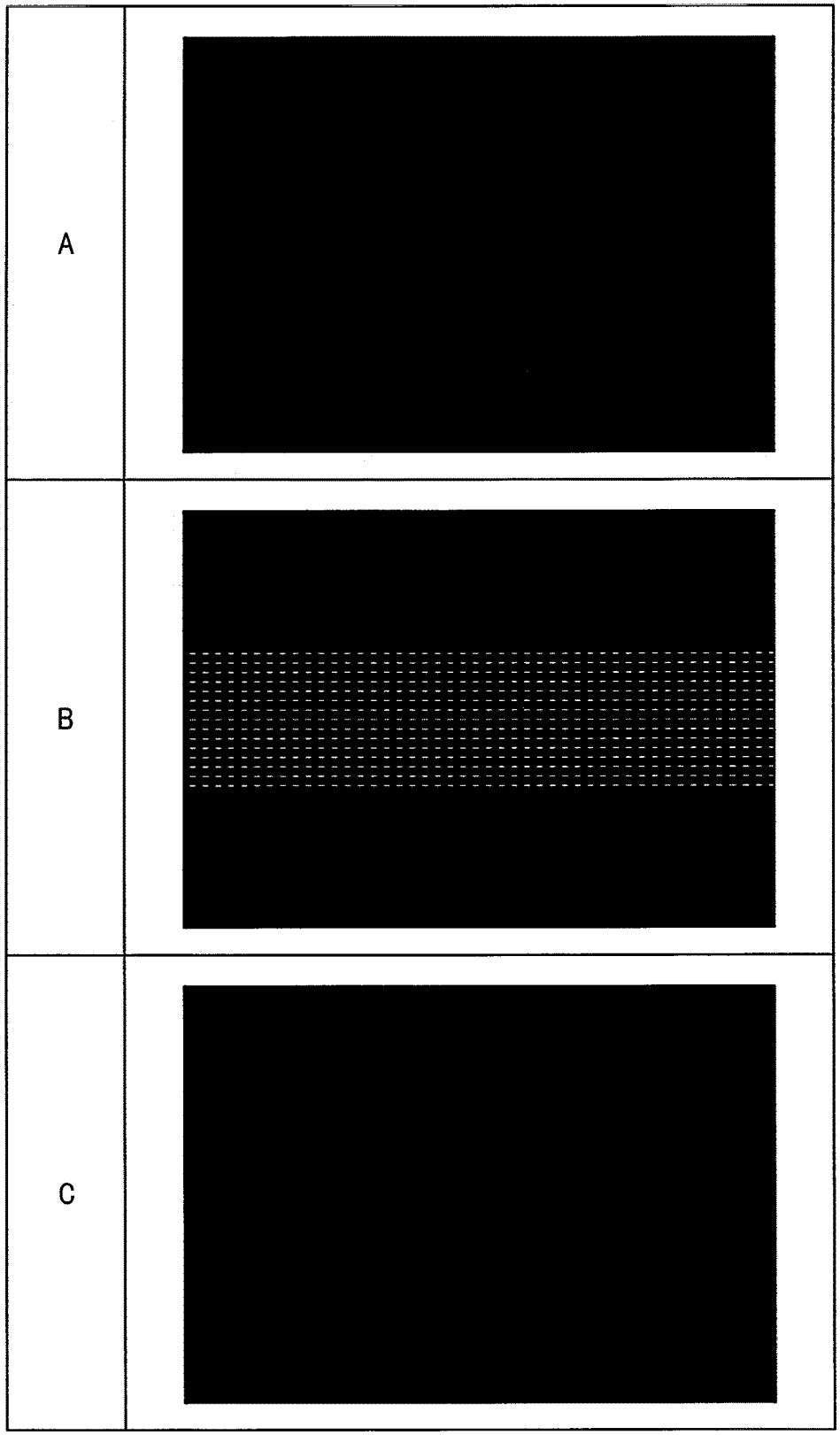
FIG. 18 is a chart showing an example of how the remaining horizontal streaks look like after image processing in some images which differ in brightness in the first embodiment.

FIG. 18 is a chart showing an example of how the remaining horizontal streaks look like after the image processing in some images which differ in brightness. For the sake of representation on paper surface, brightness of a shooting scene (object) is not expressed, but only a rough image of appearances of the remaining horizontal streaks is expressed. The same is true on FIG. 19, FIG. 20, and FIG. 25.

The A field in FIG. 18 shows an example of an image acquired, with the image sensor 2 being light shielded, and subjected to the image processing. The image at the light-shielding level is subjected to image processing for tightening the black color (black level suppressing processing). Therefore, even if the remaining horizontal streaks are present in the RAW image, the remaining horizontal streaks are invisible in the observation image after the image processing.

The B field in FIG. 18 shows an example of an image acquired as a RAW image at a middle level, and subjected to image processing. Here, the middle level is a level of about 5 to 20 (LSB) in a 12-bit full-scale RAW image. The image at the middle level is acquired by even light being applied to the pixel region 2a such that a RAW image at a level of about 5 to 20 (LSB) is picked up. At the middle level, the remaining horizontal streaks present in the RAW image are visible also in the observation image.

The C field in FIG. 18 shows an example of an image acquired as a RAW image at a middle level higher than that of the image shown in the B field, and subjected to image processing. Here, the middle level higher than that of the image shown in the B field is a level equal to or higher than about 25 (LSB) in the 12-bit full-scale RAW image. The image is acquired by even light being applied to the pixel region 2a such that a RAW image at a level equal to or higher than about 25 (LSB) is picked up.

At the middle level shown in the field C, which is higher than that shown in the field B, the remaining horizontal streaks present in the RAW image are invisible in the observation image. The reason why the remaining horizontal streaks visible in the RAW image at the middle level shown in the field B become invisible in the RAW image at the higher middle level shown in the field C is mainly because the remaining horizontal streaks are effaced by a light shot noise. Furthermore, another reason is that the remaining horizontal streaks are suppressed by the γ correction in the image processing.

Thus, whether the remaining horizontal streaks are visible (further, how the remaining horizontal streaks look like) in the image subjected to the image processing is complicated because various factors related to the image processing are entangled with one another.

Figure 19:
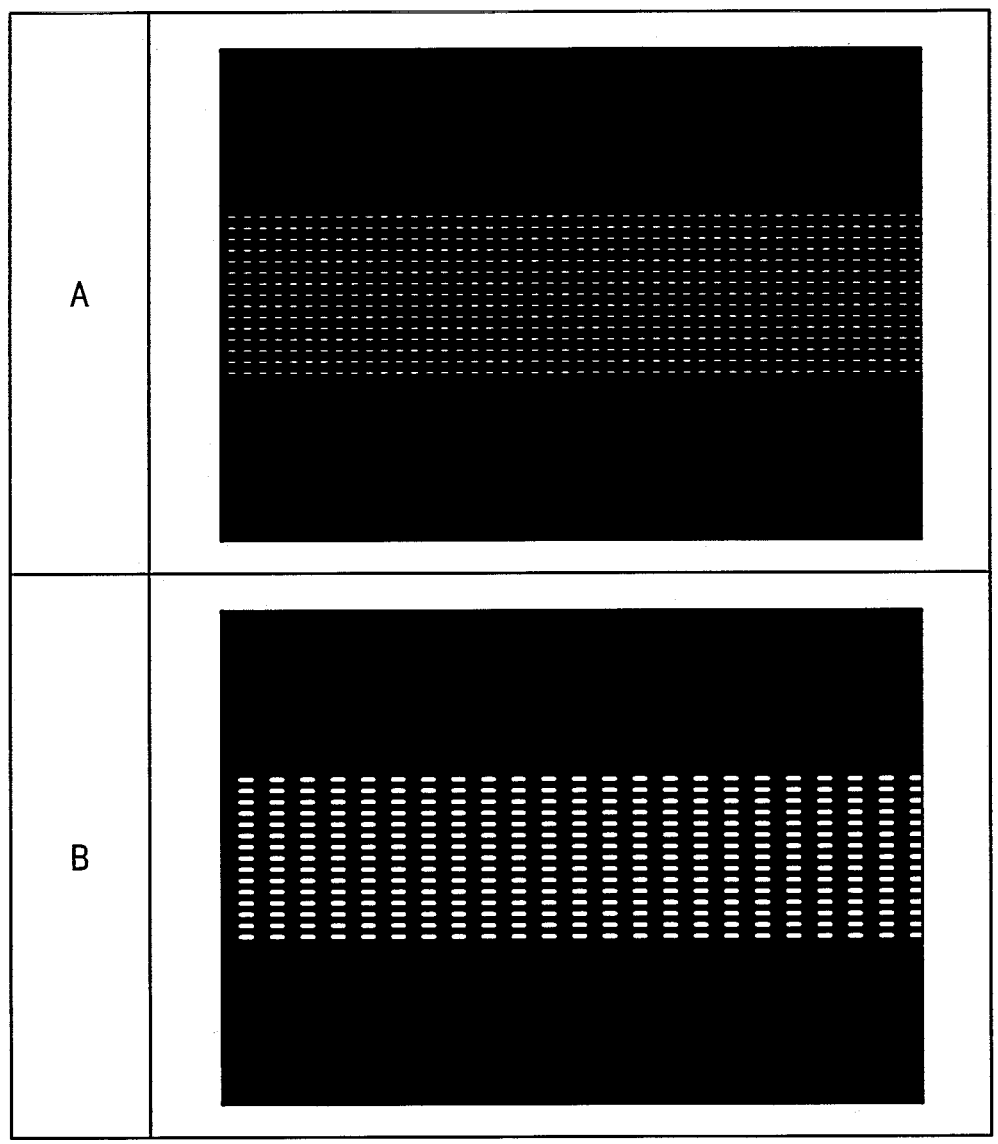
FIG. 19 is a chart showing how the remaining horizontal streaks look like in an image on which correction is performed by the VOB method and image processing is performed, according to the ISO sensitivity, in the first embodiment.

FIG. 19 is a chart showing how the remaining horizontal streaks look like in an image on which correction is performed by the VOB method and image processing is performed, according to the ISO sensitivity.

The image shown in the field B in FIG. 19 is subjected to the image processing in which the ISO sensitivity is relatively higher than that in the case shown in the field A. If the ISO sensitivity is changed, the amplification factor by the first amplifier circuit 2c and/or the second amplifier circuit 3a changes, and the intensity of the noise reduction processing by the noise reduction circuit 3c2 changes. Generally, if the ISO sensitivity is increased, the amplification factor increases, and the intensity of the noise reduction processing becomes high.

When the ISO sensitivity is increased, the remaining horizontal streaks are amplified in proportion to the amplification factor. In addition, when the ISO sensitivity is increased, the noise reduction processing is performed with high intensity, and the random noise in the entire image is reduced. Reduction of the random noise makes the remaining horizontal streaks in the observation image with the relatively high ISO sensitivity shown in the field B more noticeable than in the observation image with relatively low ISO sensitivity shown in the field A.

Figure 20:
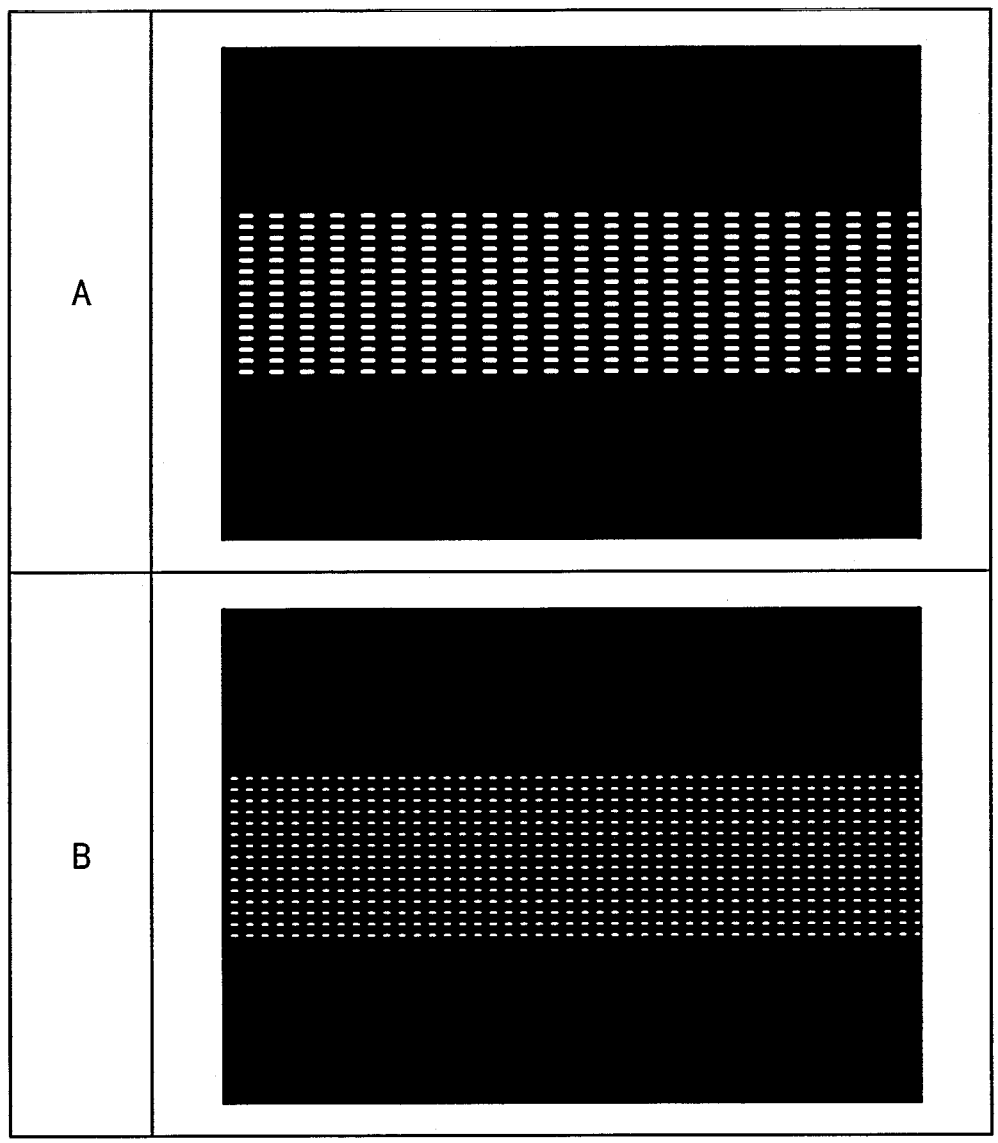
FIG. 20 is a chart showing, in comparison, appearances of the remaining horizontal streaks in images on which correction is performed respectively by the VOB method and the adjusting method and image processing is performed, by making the ISO sensitivity relatively high in the first embodiment.

FIG. 20 is a chart showing, in comparison, the appearances of the remaining horizontal streaks in the images on which correction is performed respectively by the VOB method and the adjusting method and image processing is performed, by making the ISO sensitivity relatively high.

The field A in FIG. 20 shows the image corrected by the VOB method with the ISO sensitivity being set at a relatively high value. The field B in FIG. 20 shows the image corrected by the adjusting method at the same ISO sensitivity as that set for the image in the field A.

As described above, in the VOB method, the remaining horizontal streaks increase in proportion to (in proportion to the gain) the ISO sensitivity (specifically, the amplification factor). When the ISO sensitivity is high, the remaining horizontal streaks tend to be noticeable due to the influence of the noise reduction processing.

On the other hand, in the adjusting method, the remaining horizontal streak level irregularly fluctuates depending on the environmental temperature, as shown in FIG. 15 and FIG. 16. However, the amplitude of the fluctuation shows no significant difference between FIG. 15 showing the case where the ISO sensitivity is 12800 and FIG. 16 showing the case where the ISO sensitivity is 1600, and is not proportional to the ISO sensitivity. In other words, the change in the remaining horizontal streak level is small relative to the change in the ISO sensitivity.

Thus, in the adjusting method shown in the field B in FIG. 20, the remaining horizontal streaks are hardly noticeable in the observation image after the image processing when the ISO sensitivity is high, compared with the VOB method shown in the field A.

Figures 21, 22, 23:
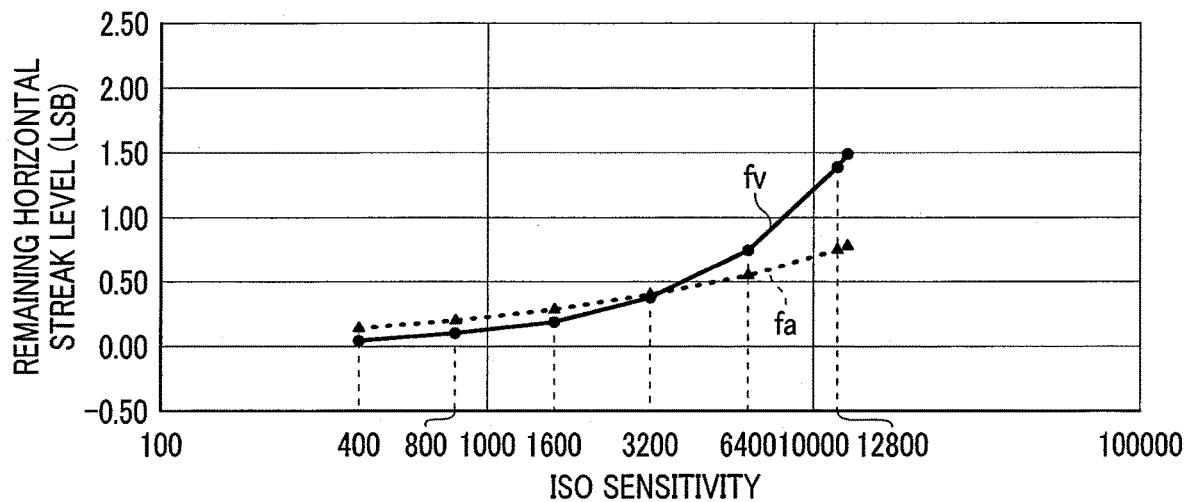
FIG. 21 is a graph showing an example of a change in an absolute value of the remaining horizontal streak level according to the ISO sensitivity, in each of the VOB method and the adjusting method in the first embodiment.
FIG. 22 is a chart showing a relative degree (high/low) of correction accuracies of the VOB method and the adjusting method with respect to the image after the image processing at an environmental temperature different from an adjusting condition, according to an ISO sensitivity, in the first embodiment.
FIG. 23 is a chart showing a relative degree (high/low) of the correction accuracies of the VOB method and the adjusting method with respect to the image after the image processing at an environmental temperature which is the adjusting condition, according to the ISO sensitivity, in the first embodiment.

FIG. 21 is a graph showing an example of a change in the absolute value of the remaining horizontal streak level according to the ISO sensitivity, in each of the VOB method and the adjusting method. Note that, in FIG. 21, the vertical axis indicates the absolute value of the remaining horizontal streak level, and the horizontal axis indicates the ISO sensitivity in a logarithmic scale.

In FIG. 21, fv represents the absolute value of the remaining horizontal streak level in the VOB method and fa represents the absolute value of the remaining horizontal streak level in the adjusting method.

As shown in the drawing, at the ISO sensitivity of 3200, the absolute value fv of the remaining horizontal streak level in the VOB method and the absolute value fa of the remaining horizontal streak level in the adjusting method substantially coincide with each other. At the ISO sensitivity lower than 3200, the absolute value fv of the remaining horizontal streak level in the VOB method is smaller than the absolute value fa of the remaining horizontal streak level in the adjusting method. At the ISO sensitivity equal to or higher than 3200, the absolute value fv of the remaining horizontal streak level in the VOB method is larger than the absolute value fa of the remaining horizontal streak level in the adjusting method. The relatively high ISO sensitivity at which the remaining horizontal streaks tend to be noticeable in the VOB method than in the adjusting method as described in FIG. 20 indicates the ISO sensitivity relatively higher than the ISO sensitivity equal to or lower than 3200, for example, 6400, 12800, or the like that can be read from FIG. 21.

Therefore, it is possible to read, from the example shown in FIG. 21, the tendency that the VOB method is advantageous at the ISO sensitivity lower than 3200 and the adjusting method is advantageous at the ISO sensitivity equal to or higher than 3200.

FIG. 22 is a chart showing a relative degree (high/low) of the correction accuracies of the VOB method and the adjusting method with respect to the image after the image processing at the environmental temperature different from the adjusting condition, according to the ISO sensitivity.

When the ISO sensitivity is low, the correction accuracy of the VOB method is relatively higher than that of the adjusting method. When the ISO sensitivity is high, the correction accuracy of the VOB method is relatively lower than that of the adjusting method.

However, FIG. 22 shows the correction accuracies at an environmental temperature different from the adjusting condition (temperature lower or higher than the adjusting condition).

FIG. 23 is a chart showing a relative degree (high/low) of the correction accuracies of the VOB method and the adjusting method with respect to the image after the image processing at the environmental temperature, which is the adjusting condition, according to the ISO sensitivity.

At the environmental temperature as the adjusting condition (a predetermined temperature range including a predetermined temperature as the adjusting condition: indicated as the normal temperature in FIG. 23), the adjusting method shows a high correction accuracy even in the case where the ISO sensitivity is low.

Incidentally, to what extent the remaining horizontal streaks can be seen in the observation image varies greatly depending on the characteristics of the γ-correction performed in image processing. The characteristics of the γ-correction indicate conversion characteristics of encoding processing for optimizing a bit allocation and an image transmission bandwidth, by using a nonlinearity when a human being perceives brightness and colors, and further in view of picture making.

In the γ-correction, as actual processing, conversion is performed in many cases by using a table in order to perform optimization based on the viewpoint of picture making, rather than by using a simple mathematical equation.

In addition, a camera is generally equipped with a plurality of image quality modes. In general, one camera includes a plurality of γ-correction characteristics such that optimal γ-correction can be performed in accordance with each of the plurality of image quality modes. Furthermore, the γ-correction characteristics are different and diverse for each company that develops cameras.

In recent shooting of a moving image, a video with a wider dynamic range is required as a video expression. As a γ-correction standard that meets such a requirement, Hybrid Log Gamma (HLG) standard is specified and has been introduced. The HLG is a standard specification specified for high dynamic range (HDR) broadcast. The HLG is specified according to the characteristics of display monitors. Video subjected to the γ-correction according to the HLG can be displayed normally on a normal common dynamic range display, and is displayed with a wider dynamic range on an HLG-compatible display.

Furthermore, in recent years, high-end digital video cameras or digital cameras that are used for high-quality moving image shooting such as movie production have been equipped with a function called Log shooting.

In Log shooting, a wide dynamic range video in which more information on shadow areas and highlighted areas are left is shot on the assumption that color grading is performed on the shot video.

Therefore, in the Log shooting, image data is corrected based on a γ-correction characteristic (Log γ-correction characteristic) similar to a logarithmic curve. The reason why the above-described shooting is called Log shooting is that the Log γ-correction characteristic is used. The Log γ-correction characteristic is also different and diverse for each company that develops cameras, similarly to the above-described γ-correction characteristics.

Note that the video obtained by the Log shooting is not intended to be watched as it is. Therefore, if the video is displayed without performing color grading, the video often appears as an image with low saturation.

Figure 24:
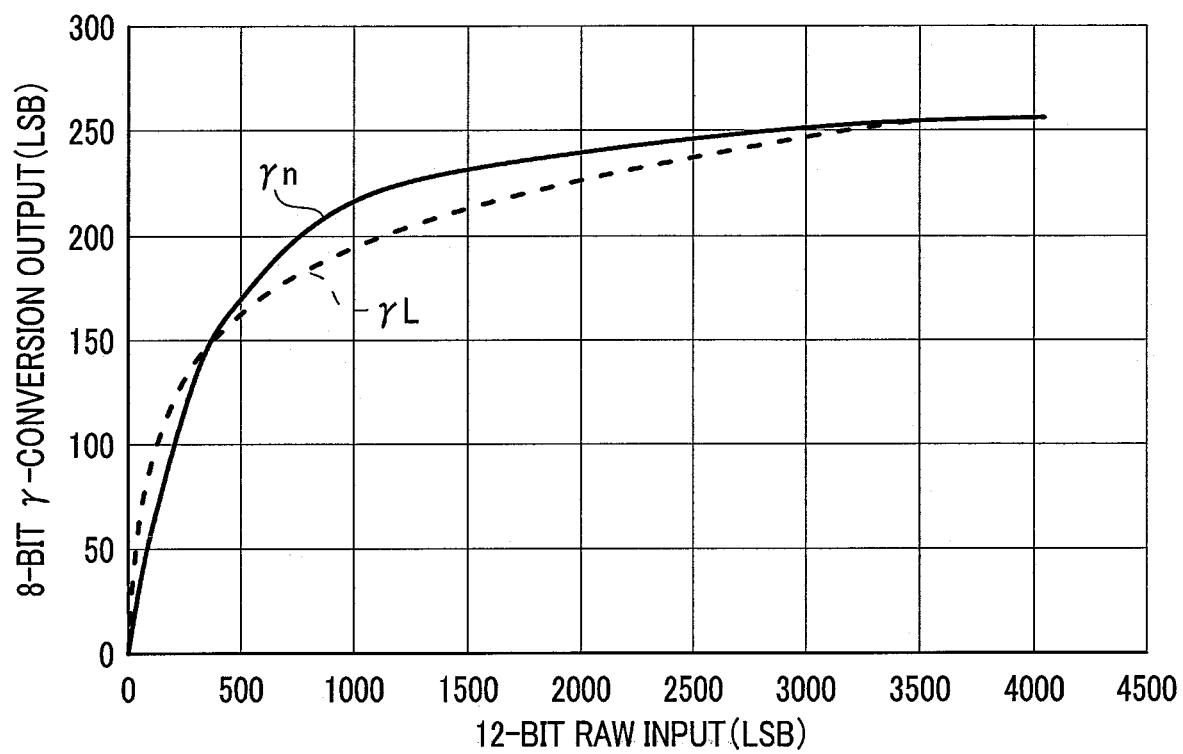
FIG. 24 is a graph showing examples of a natural γ-correction characteristic and a Log γ-correction characteristic in the first embodiment.

FIG. 24 is a graph showing examples of a natural γ-correction characteristic and the Log γ-correction characteristic. FIG. 24 shows a conversion characteristic when a 12-bit RAW image is used as an input signal and γ-converted into an 8-bit output signal.

In FIG. 24, γL represents the Log γ-correction characteristic and γn represents the conventional (natural) γ-correction characteristic. Numerical examples of gradients at about 5 to 20 (LSB) to be noted in the 12-bit RAW image will be shown below. The gradients are defined as 8-bit conversion output (LSB)/12-bit RAW input (LSB).

When the 12-bit RAW input is 5 (LSB), the gradient of γL is 9/5, and the gradient of γn is 3/5. Thus, the gradient of γL is three times the gradient of γn. In addition, when the 12-bit RAW input is 20 (LSB), the gradient of γL is 32/20, and the gradient of γn is 12/20. Thus, the gradient of γL is 2.7 times the gradient of γn.

Thus, γL has a characteristic of rising with the gradient that is 2 to 3 times larger than the gradient of γn on the low-luminance side. Here, an intermediate gradient between the gradient of γL and the gradient of γn in a certain input pixel value on the low-luminance side is defined as a predetermined gradient.

At this time, the gradient (parameter) of the γ-correction characteristic in the certain input pixel value on the low-luminance side can be classified as γL, if the gradient is larger than the predetermined gradient, and can be classified as γn, if the gradient is equal to or smaller than the predetermined gradient.

The predetermined gradient may be defined, for example, as 6/5 when the 12-bit RAW input is 5 (LSB), and as 22/20 when the 12-bit RAW input is 20 (LSB). The γ-correction characteristic according to the above-described HLG standard is similar to the Log γ-correction characteristic, although details are different, and the gradient of the γ-correction characteristic in the certain input pixel value on the low-luminance side is larger than the predetermined gradient.

Figure 25:
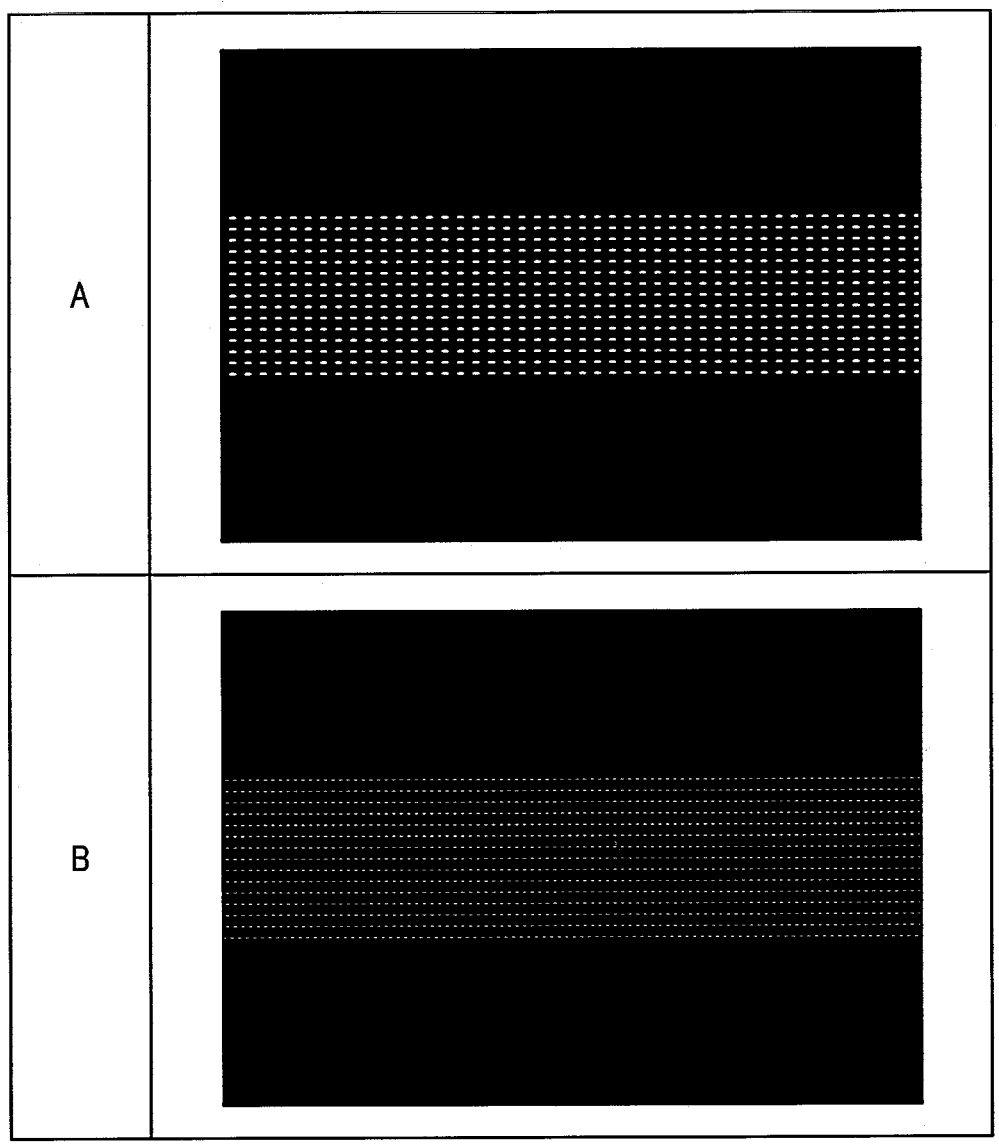
FIG. 25 is a chart showing an example of appearances of the remaining horizontal streaks in the images on which image processing has been performed respectively with the Log γ-correction characteristic and the natural γ-correction characteristic in the first embodiment.

FIG. 25 is a chart showing an example of appearances of the remaining horizontal streaks in the images on which image processing has been performed respectively with the Log γ-correction characteristic and the natural γ-correction characteristic.

The field A and the field B in FIG. 25 show the image converted with the Log γ-correction characteristic and the image converted with the natural γ-correction characteristic, respectively. Compared with the image converted with the Log γ-correction characteristic shown in the field A, visibility of the remaining horizontal streaks in the image converted with the natural γ-correction characteristic shown in the field B tend to be remarkably low (invisible level).

Figure 26:
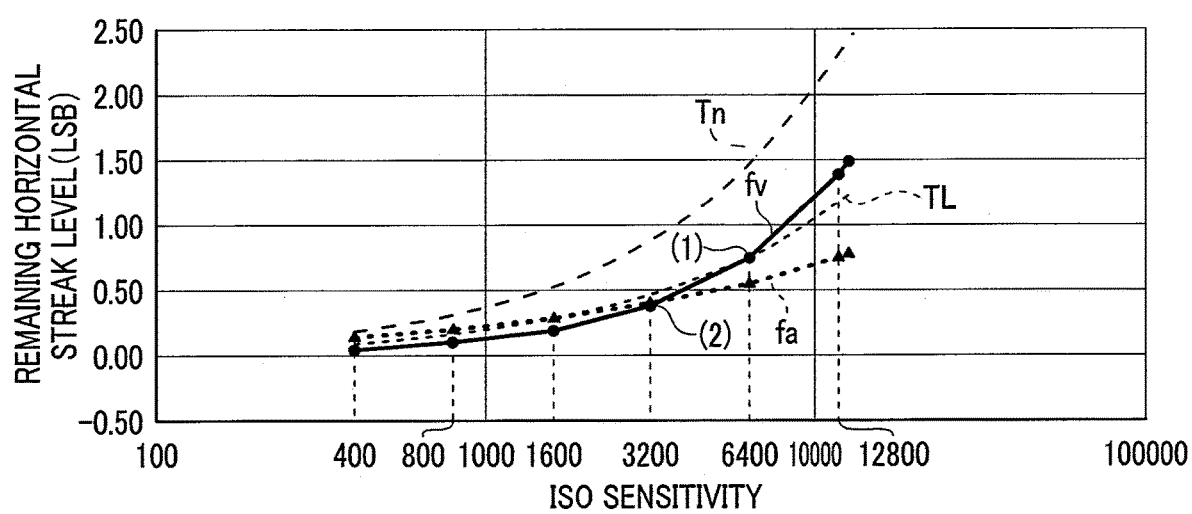
FIG. 26 is a graph showing an allowable threshold level in each of the Log γ-correction characteristic and the natural γ-correction characteristic relative to the absolute value of the remaining horizontal streak level in each of the VOB method and the adjusting method according to the ISO sensitivity, in the first embodiment.

FIG. 26 is a graph showing an allowable threshold level in each of the Log γ-correction characteristic and the natural γ-correction characteristic relative to the absolute value of the remaining horizontal streak level in each of the VOB method and the adjusting method according to the ISO sensitivity. Note that, in FIG. 26, the vertical axis indicates the absolute value of the remaining horizontal streak level, and the horizontal axis indicates the ISO sensitivity in the logarithmic scale.

As with FIG. 21, fv represents the absolute value of the remaining horizontal streak level in the VOB method and fa represents the absolute value of the remaining horizontal streak level in the adjusting method. The magnitude correlation between the absolute value fv of the remaining horizontal streak level and the absolute value fa of the remaining horizontal streak level according to the ISO sensitivity is the same as that described in FIG. 21.

In addition, TL represents the allowable threshold level when the image processing is performed with the Log γ-correction characteristic, and Tn represents the allowable threshold level when the image processing is performed with the natural γ-correction characteristic. Note that the allowable threshold levels TL, Tn each have a gradient proportional to the ISO sensitivity, but each is a curve having a convex shape downward, because the horizontal axis is the logarithmic scale.

The absolute value fv of the remaining horizontal streak level and the absolute value fa of the remaining horizontal streak level are smaller than the allowable threshold level Tn in the entire range in which the ISO sensitivity is 400 to 12800. In other words, the natural γ-correction characteristic has a wide allowable range for the remaining horizontal streaks. In the example shown in FIG. 26, the appearance of the remaining horizontal streaks after the image processing does not change (that is, the remaining horizontal streaks are not visible), regardless of whether the VOB method or the adjusting method is used.

On the other hand, the absolute values fa and fv have the following tendencies with respect to the allowable threshold level TL.

The absolute value fa of the remaining horizontal streak level is equal to or larger than the allowable threshold level TL when the ISO sensitivity is equal to or lower than 1600, and is smaller than the allowable threshold level TL when the ISO sensitivity is higher than 1600.

The absolute value fv of the remaining horizontal streak level is equal to or smaller than the allowable threshold level TL when the ISO sensitivity is equal to or lower than 6400, and is larger than the allowable threshold level TL when the ISO sensitivity is higher than 6400.

In other words, the Log γ-correction characteristic has a narrower allowable range for the remaining horizontal streaks than the natural γ-correction characteristic, and the appearance of the remaining horizontal streaks after the image processing differs in the VOB method and the adjusting method.

As in the example shown in FIG. 26, when the relationship between the allowable threshold level TL and the absolute values fv, fa of the remaining horizontal streak levels is complicated, several points can be set as points at which the VOB method and the adjusting method are switched to each other.

For example, the VOB method and the adjusting method may be switched to each other at the point (1) at which the ISO sensitivity is 6400. In this case, in a range in which the absolute value fv of the remaining horizontal streak level is equal to or smaller than the allowable threshold level TL (range in which the ISO sensitivity is equal to or lower than 6400), the VOB method is used, and the VOB method may be switched to the adjusting method in a range in which the absolute value fv of the remaining horizontal streak level exceeds the allowable threshold level TL (range in which the ISO sensitivity is higher than 6400).

In addition, the VOB method and the adjusting method may be switched to each other at the point (2) at which the ISO sensitivity is 3200. In this case, the method may be switched to the one, the remaining horizontal streak level of which is not larger (or smaller, if the levels are different) of the absolute value fv of the remaining horizontal streak level and the absolute value fa of the remaining horizontal streak level. Specifically, the VOB method may be used in the range in which the ISO sensitivity is equal to or lower than 3200, and may be switched to the adjusting method in the range in which the ISO sensitivity is higher than 3200.

In the case where the relationship between the accuracies of the horizontal streak correction methods and the characteristics of the image processing is complicated, there is a case where the horizontal streak correction method is switched between the VOB method and the adjusting method by focusing on the γ-correction characteristic of the characteristics of the image processing and there is a case where the horizontal streak correction method is switched between the VOB method and the adjusting method by focusing on the intensity of the noise reduction processing of the characteristics of the image processing.

In general, when a camera automatically controls the ISO sensitivity (the case of AutoISO), it is preferable for the operation of the camera that the VOB method and the adjusting method do not switch too frequently. In this viewpoint, the point (1) at which the switching of the methods occurs less frequently is more preferable than the point (2).

As described above, in the RAW image, the VOB method and the adjusting method differ in the characteristics of the repetitive variations and the temperature dependencies of the remaining horizontal streak levels after the horizontal streak correction (see FIG. 17).

Furthermore, the remaining horizontal streak levels after the image processing (γ-correction, signal amplification and noise reduction processing according to the ISO sensitivity, etc.) is performed on the RAW image differ in the correction accuracies as shown in FIG. 22 and FIG. 23, depending on the environmental temperature and the ISO sensitivity.

Figure 27:
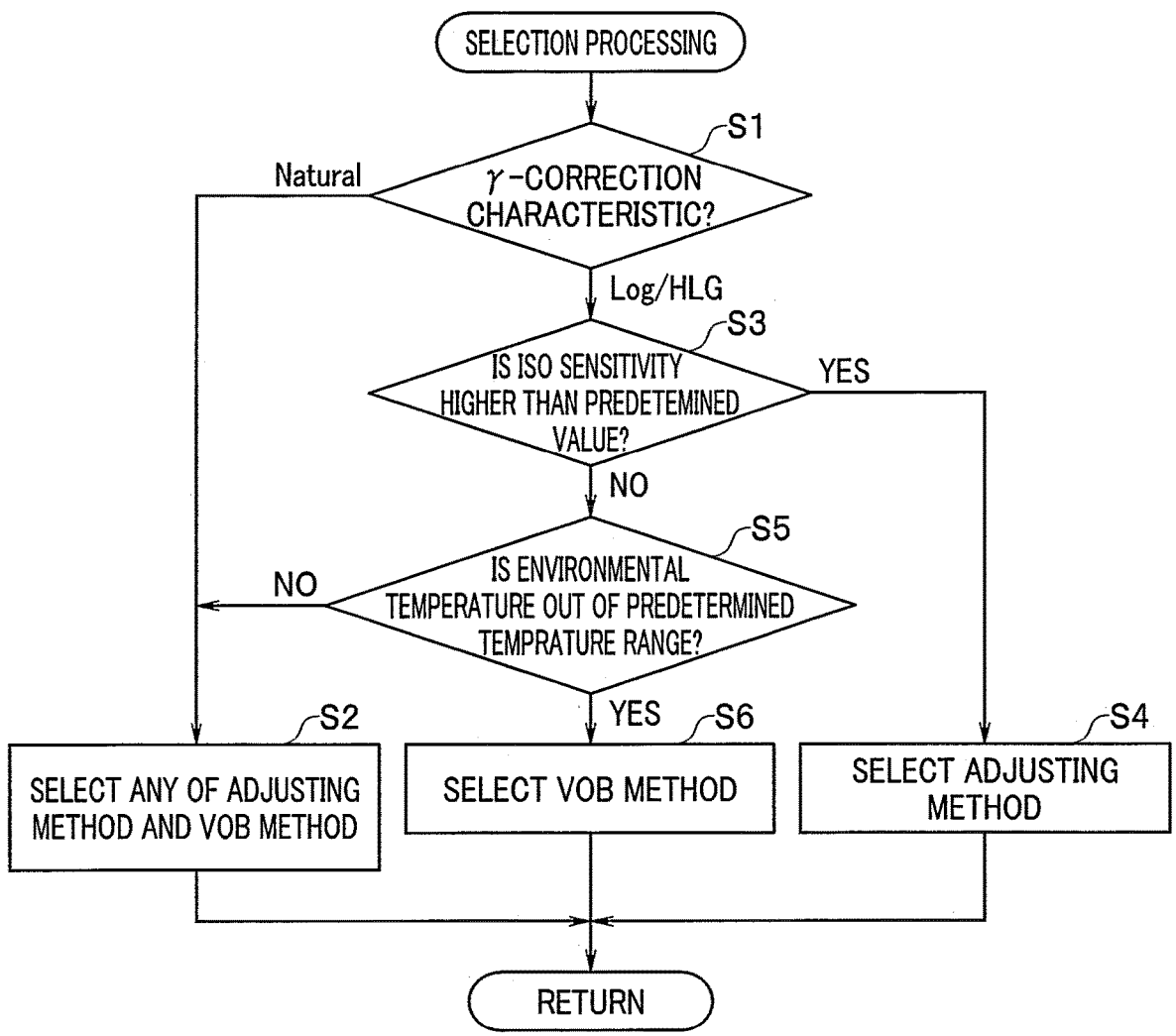
FIG. 27 is a flowchart showing an example of processing for selecting one of the VOB method and the adjusting method in the first embodiment.

According to such characteristics and correction accuracies, the selecting processing for switching between the VOB method and the adjusting method as shown in FIG. 27 is performed, for example, to thereby minimize the remaining horizontal streak level after the image processing or reduce the remaining horizontal streak level to the allowable level or lower, to enable the appearances of the remaining horizontal streaks to be optimized.

FIG. 27 is a flowchart showing an example of processing for selecting one of the VOB method and the adjusting method. The processing shown in FIG. 27 may be performed by the horizontal streak correction circuit 3b. In addition, the camera controller 10 may perform the processing in FIG. 27, to set a result selected by the processing in the horizontal streak correction circuit 3b. Here, description will be made supposing that, for example, the camera controller 10 performs the processing in FIG. 27.

When the procedure proceeds from the main processing not shown in the camera to the selection processing, the camera controller 10 determines that the γ-correction characteristic set according to the image quality mode or the like is either the natural γ-correction characteristic or the Log γ-correction characteristic (Step S1).

Here, when it is determined that the γ-correction characteristic is the natural γ-correction characteristic, as description has been made with reference to FIG. 26, both the absolute value fv of the remaining horizontal streak level and the absolute value fa of the remaining horizontal streak level are smaller than the allowable threshold level Tn at any settable ISO sensitivity. Therefore, the camera controller selects any one of the adjusting method and the VOB method (Step S2). Specifically, the camera controller 10 has only to maintain the method that has been used till then, without changing the method. Therefore, if the VOB method has been used till then, the VOB method is used continuously, and if the adjusting method has been used till then, the adjusting method is used continuously.

In Step S1, when determining that the γ-correction characteristic is the Log γ-correction characteristic, the camera controller 10 further determines whether or not the ISO sensitivity is higher than a predetermined value (Step S3). In the example described with reference to FIG. 26, the predetermined value is 6400 at the point (1) or 3200 at the point (2).

When determining that the ISO sensitivity is higher than the predetermined value, the camera controller 10 selects the adjusting method, to set the selected adjusting method in the horizontal streak correction circuit 3b (Step S4).

On the other hand, when determining that the ISO sensitivity is equal to or lower than the predetermined value in Step S3, the camera controller 10 further determines whether or not the environmental temperature measured by the temperature sensor 11 is out of a predetermined temperature range (Step S5). Here, the predetermined temperature range is a certain range (range to which the chart in FIG. 23 is applied) including the environmental temperature (predetermined temperature) as the adjusting condition.

In Step S4, when it is determined that the environmental temperature is within the predetermined temperature range including the environmental temperature as the adjusting condition, if the ISO sensitivity is low, the correction accuracy is high both in the VOB method and the adjusting method, as shown in FIG. 23. Therefore, the camera controller 10 proceeds the procedure to Step S2, to maintain the method that has been used till then, without changing the method.

In addition, in Step S5, when determining that the environmental temperature is out of the predetermined temperature range, the camera controller 10 selects the VOB method, to set the selected VOB method in the horizontal streak correction circuit 3b (Step S6). Thus, the environmental temperature is another parameter to be used by the horizontal streak correction circuit 3b for selecting the correction method.

When the horizontal streak correction method is thus selected in Step S2, S4, or S6, the processing is terminated to return to the main processing not shown.

Note that the horizontal streak correction method is selected according to the three factors, i.e., the γ-correction characteristic, the ISO sensitivity, and the environmental temperature in the processing shown in FIG. 27. However, one or more of the factors may be used for selecting the horizontal streak correction method, and not all of the three factors have to be used.

For example, selection of the horizontal streak correction method based on the environmental temperature may be omitted, for example, and the horizontal streak correction method may be selected based on the γ-correction characteristic and the ISO sensitivity. In such a case, the temperature sensor 11 may not be provided in the image pickup apparatus. In the processing in FIG. 27, when it is determined that the γ-correction characteristic is the natural γ-correction characteristic in Step S1, the procedure may proceed to Step S2, and when it is determined that the ISO sensitivity is higher than the predetermined value in Step S3, the procedure may proceed to Step S4, and when it is determined that the ISO sensitivity is equal to or lower than the predetermined value in Step S3, the procedure may proceed to Step S6.

In addition, the horizontal streak correction method may be selected based only on the γ-correction characteristic, for example. Specifically, when the γ-correction characteristic is the natural γ-correction characteristic, the VOB method may be selected, and when the γ-correction characteristic is the Log γ-correction characteristic, the adjusting method may be selected (see also FIG. 26 and description of FIG. 26).

Furthermore, the horizontal streak correction method may be selected based only on the ISO sensitivity, for example.

Specifically, in Step S3 in FIG. 27, the VOB method may be selected (Step S6) at the ISO sensitivity equal to or lower than the ISO sensitivity at the point (1) or the point (2), and the adjusting method may be selected (Step S4) at the ISO sensitivity higher than the ISO sensitivity at the point (1) or the point (2). In this case, the processing in Step S1, S2, and S5 may be omitted in the processing in FIG. 27.

As described above, the change in the ISO sensitivity is related to the change in the amplification factor and the change in the intensity of the noise reduction processing. Instead of performing the selection of the horizontal streak correction method based on the ISO sensitivity, selection of the horizontal streak correction method based on the amplification factor, and the selection of the horizontal streak correction method based on the intensity of the noise reduction processing may be respectively performed.

For example, the horizontal streak correction circuit 3b may select the first offset correction method (VOB method) when the amplification factor is equal to or smaller than the predetermined amplification factor, and may select the second offset correction method (adjusting method) when the amplification factor is larger than the predetermined amplification factor. In addition, the horizontal streak correction circuit 3b may select the first offset correction method (VOB method) when the intensity of the noise reduction processing is equal to or lower than the predetermined intensity, and may select the second offset correction method (adjusting method) when the intensity is higher than the predetermined intensity.

Furthermore, the horizontal streak correction method may be selected based not only on the γ-correction characteristic, the ISO sensitivity, the environmental temperature, the amplification factor, and the intensity of the noise reduction processing, as described above, but also on other factors related to the image processing and the picture making.

Thus, in the high-speed video phase difference reading mode, the horizontal streak correction method is optimized by taking the parameters for the image processing into consideration, to thereby be capable of optimizing (minimizing, or reducing to a level equal to or lower than the allowable level) the remaining horizontal streak level after the horizontal streak correction and the image processing are performed.

Note that FIG. 5 shows the example in which the pixel signal (L+R) and the divisional pixel signal L are read from the 2PD region in the high-speed video phase difference reading mode with priority for the image quality. Alternatively, the divisional pixel signal L and the divisional pixel signal R can be read from the 2PD region in the above-described high-speed video phase difference reading mode with priority for the phase difference detection performance.

FIG. 28 is a diagram showing an example of signals read from the image sensor 2 in the high-speed video phase difference reading mode with priority for the phase difference detection performance.

In the case of the high-speed video phase difference reading mode with priority for the phase difference detection performance, the horizontal streak correction circuit 3b performs the processing (B1) to (B3) as shown below to correct the horizontal streaks in the RAW image data by the VOB method.

(B1) Calculation Processing of OB Level from Signal in Vertical OB Region

The horizontal streak correction circuit 3b calculates an average value of the signals each read from the photoelectric conversion device PDL in each of the pixels 2p in the rectangular region (2PD region) set in the first vertical OB region VOB1, to obtain the OB level OB_L. Further, the horizontal streak correction circuit 3b calculates an average value of the signals each read from the photoelectric conversion device PDR in each of the pixels 2p in the rectangular region (2PD region) set in the first vertical OB region VOB1, to obtain the OB level OB_R. Furthermore, the horizontal streak correction circuit 3b calculates an average value of the signals each obtained by adding the signal of the photoelectric conversion device PDL and the signal of the photoelectric conversion device PDR in each of the pixels 2p in the rectangular region (1PD region) set in the second vertical OB region and read, to obtain the OB level OB_ALL.

(B2) Addition Processing of Left and Right Divisional Pixel Signals in Vertical OB Region The horizontal streak correction circuit 3b adds the average values of the left and right divisional pixel signals read from the 2PD region in the vertical OB region, to calculate an additional value SumOB based on (Equation 4).

$$\mathrm{Sum}OB = OB\_L + OB\_R \quad \text{(Equation 4)}$$

(B3) Addition Processing of Left and Right Divisional Pixel Signals in Effective Region VReff The horizontal streak correction circuit 3b performs an arithmetic operation of (Equation 5) on each of the pixels 2p in the 2PD region in the phase difference detection region VRP set in the effective region VReff, to obtain an arithmetic operation result Sum.

$$\mathrm{Sum} = (L+R) - \mathrm{Sum}OB + OB\_\mathrm{ALL} = (L-OB\_L) + (R-OB\_R) + OB\_\mathrm{ALL} \quad \text{(Equation 5)}$$

(Equation 5) indicates execution of the following processing. In other words, the horizontal streak correction circuit 3b adds the divisional pixel signals L and R read from the normal pixel in the 2PD region, to generate an addition normal pixel signal (L+R). Then, the horizontal streak correction circuit 3b subtracts the OB levels OB_L, OB_R read from the OB pixel in the 2PD region from the addition normal pixel signal (L+R), to generate a provisional OB subtraction pixel signal {(L−OB_L)+(R−OB_R)}. Further, the horizontal streak correction circuit 3b adds the average OB pixel signal OB_ALL read from the OB pixel in the 1PD region to the provisional OB subtraction pixel signal {(L−OB_L)+(R−OB_R)}, to generate the arithmetic operation result Sum as pixel data.

Next, in the high-speed video phase difference reading mode with priority for the phase difference detection performance, the horizontal streak correction circuit 3b calculates, in the adjusting process, the OB level Comp_(L+R)_ALL_Offset (value determined in advance) to be used in the adjusting method as shown below. Here, it is the signals of the effective region VReff of the image of one frame or more obtained with the image sensor 2 being light shielded that are used for calculating the OB level Comp_(L+R)_ALL_Offset.

Specifically, the horizontal streak correction circuit 3b calculates an average value of the signals each read from the photoelectric conversion device PDL in each of the pixels 2p in the 2PD region in the effective region VReff, to obtain the OB level Comp_L. In addition, the horizontal streak correction circuit 3b calculates an average value of the signals each read from the photoelectric conversion device PDR in each of the pixels 2p in the 2PD region in the effective region VReff, to obtain the OB level Comp_R.

Furthermore, the horizontal streak correction circuit 3b calculates an average value of the signals each obtained by adding the signal of the photoelectric conversion device PDL and the signal of the photoelectric conversion device PDR in each of the pixels 2p in the 1PD region in the effective region VReff and read, to obtain the OB level Comp_ALL.

Then, the horizontal streak correction circuit 3b calculates the OB level Comp_(L+R)_ALL_Offset to be used in the adjusting method based on (Equation 6).

$$\mathrm{Comp}\_(L+R)\_\mathrm{ALL}\_\mathrm{Offset} = \mathrm{Comp}\_L + \mathrm{Comp}\_R - \mathrm{Comp}\_\mathrm{ALL} \quad \text{(Equation 6)}$$

The horizontal streak correction by the adjusting method using the OB level Comp_(L+R)_ALL_Offset obtained by (Equation 6) is performed based on the above-described (Equation 3).

Thus, the selection of the adjusting method and the VOB method by the horizontal streak correction circuit 3b can be performed not only in the high-speed video phase difference reading mode with priority for the image quality but also in the high-speed video phase difference reading mode with priority for the phase difference detection performance.

Note that, in the VOB method, the repetitive variation fluctuation (fluctuation with the standard deviation σ as an index) as shown in FIG. 11 occurs due to the fluctuation of the OB level obtained from the vertical OB region VOB for each frame. In addition, there is an average difference between the OB level of the vertical OB region VOB and the OB level of the effective region VReff, which causes an average deviation of the correction amount (remaining horizontal streak level average value μ≠0) in the VOB method, as shown in FIG. 11. In order to improve the characteristics of the VOB method, it is preferable to correct such an average deviation.

A method similar to the adjusting method is used, in the adjusting process, to acquire images of a plurality of frames from the image sensor 2 which is in the light-shielded state, and calculate an average value of the pixel signals each obtained after performing the first offset correction on the pixel signal which has been obtained from the plurality of signals read from the second row of the effective region VReff of each of the images of the plurality of frames. The average value calculated here indicates an average difference between the OB level difference {OB_(L+R)−OB_ALL} in the 2PD region and the 1PD region in the vertical OB region VOB and the OB level difference {OB_(L+R)−OB_ALL} in the 2PD region and the 1PD region in the effective region VReff, and corresponds to the average value μ in FIG. 11. The calculated average value μ is saved in the memory in the camera controller Then, when the correction using the VOB method is performed on the image acquired in the non-light-shielded state, the correction is performed after correcting the OB level difference {OB_(L+R)−OB_ALL} calculated from the signals in the vertical OB region VOB obtained for each frame with the average value μ acquired from the memory in the camera controller 10.

Thus, the VOB method is further corrected by using the average value μ acquired in the adjusting process, which results in an improvement in the horizontal streak correction performance. Improvement in the performance of the VOB method enables the switching points (the points (1) (2) shown in FIG. 26, for example) according to the ISO sensitivity to be changed to a point of higher ISO sensitivity. This can reduce the frequency at which the VOB method and the adjusting method are switched to each other.

According to the first embodiment thus configured, the horizontal streaks can be made less noticeable in the observation image obtained by performing the image processing on the signals read in the high-speed video phase difference reading mode.

Note that description has been made above mainly on the case where the present invention is an image pickup apparatus, but the present invention is not limited to the case. The present invention may also be an image processing method for performing the same processing as that performed by the image pickup apparatus, a computer program for causing a computer to perform the same processing as that performed by the image pickup apparatus, a non-transitory computer-readable storage medium that stores the computer program, and the like.

Some examples of the storage medium that stores a computer program product include a portable storage medium such as a flexible disk, a CD-ROM (Compact Disc Read only memory), a DVD (Digital Versatile Disc) or the like, or a storage medium such as hard disk, or the like. It is not limited to the entirety of the computer program to be stored in the storage medium, but even a part of the computer program may be stored in the storage medium. The entirety or a part of the computer program may also be distributed or provided via a communication network. When a user installs the computer program on the computer from the storage medium or downloads the computer program via the communication network and installs it on the computer, the computer program is read by the computer and all or part of the operations are executed, to thereby enable the operations of the image pickup apparatus as described above to be executed.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
    a pixel region in which a plurality of pixels each including one microlens and a plurality of photoelectric conversion devices are two-dimensionally arranged in a unit of row, the pixel region comprising a light-shielding region having a plurality of light-shielded rows, and an effective region having a plurality of rows to which light reaches;
    a reading circuit configured to read, from each pixel in a first row of each of the light-shielding region and the effective region, a pixel signal obtained by adding all signals of the plurality of photoelectric conversion devices, and to read, from each pixel in a second row of each of the light-shielding region and the effective region, a plurality of signals including phase difference information;
    a horizontal streak correction circuit configured to perform one of a first offset correction and a second offset correction on a pixel signal obtained from the plurality of signals read from the second row of the effective region, the first offset correction being based on the pixel signal read from the first row of the light-shielding region and the plurality of signals read from the second row of the light-shielding region, the second offset correction being based on a value determined in advance; and
    an image processing circuit configured to perform image processing on image data according to a parameter, the image data being configured based on the pixel signal subjected to the first offset correction or the second offset correction and the pixel signal read from the first row of the effective region,
    wherein the horizontal streak correction circuit selects which of the first offset correction and the second offset correction to perform, according to the parameter.

2. The image pickup apparatus according to claim 1, wherein
    the image processing circuit includes a noise reduction circuit configured to perform noise reduction processing on the image data, and
    the parameter includes an intensity of the noise reduction processing.

3. The image pickup apparatus according to claim 2, wherein
    the horizontal streak correction circuit selects the first offset correction when the intensity is equal to or lower than a predetermined intensity and selects the second offset correction when the intensity is higher than the predetermined intensity.

4. The image pickup apparatus according to claim 2, wherein
    the image processing circuit further includes a γ-correction circuit configured to correct the image data based on a γ-correction characteristic, and
    the horizontal streak correction circuit selects the first offset correction or the second offset correction according to the intensity, when a gradient of the γ-correction characteristic in a certain input pixel value is larger than a predetermined gradient.

5. The image pickup apparatus according to claim 4, wherein
    the horizontal streak correction circuit does not perform the selection according to the intensity when the gradient is equal to or smaller than the predetermined gradient, but perform any one of the first offset correction and the second offset correction.

6. The image pickup apparatus according to claim 3, further comprising a temperature sensor configured to measure an environmental temperature, wherein
    the value determined in advance is generated, at a predetermined temperature, based on a pixel signal read from the first row of the effective region in a light-shielded state and a plurality of signals read from the second row of the effective region in the light-shielded state, and
    the horizontal streak correction circuit selects the first offset correction according to the intensity, when the intensity is equal to or lower than the predetermined intensity and the environmental temperature is out of a predetermined temperature range including the predetermined temperature.

7. The image pickup apparatus according to claim 6, wherein
    the horizontal streak correction circuit does not perform the selection according to the intensity when the intensity is equal to or lower than the predetermined intensity and the environmental temperature is within the predetermined temperature range, but perform any one of the first offset correction and the second offset correction.

8. The image pickup apparatus according to claim 1, wherein
    the image processing circuit further includes an amplifier circuit configured to amplify the pixel signal read from the first row of the effective region and the plurality of signals read from the second row of the effective region by a set amplification factor, and
    the parameter includes the amplification factor.

9. The image pickup apparatus according to claim 8, wherein
the horizontal streak correction circuit selects the first offset correction when the amplification factor is equal to or smaller than a predetermined amplification factor, and selects the second offset correction when the amplification factor is larger than the predetermined amplification factor.

10. The image pickup apparatus according to claim 8, wherein
the image processing circuit further includes a γ-correction circuit configured to correct the image data based on a γ-correction characteristic, and
the horizontal streak correction circuit selects the first offset correction or the second offset correction according to the amplification factor, when a gradient of the γ-correction characteristic in a certain input pixel value is larger than a predetermined gradient.

11. The image pickup apparatus according to claim 10, wherein
the horizontal streak correction circuit does not perform the selection according to the amplification factor when the gradient is equal to or smaller than the predetermined gradient, but perform any one of the first offset correction and the second offset correction.

12. The image pickup apparatus according to claim 9, further comprising a temperature sensor configured to measure an environmental temperature, wherein
the value determined in advance is generated, at a predetermined temperature, based on a pixel signal read from the first row of the effective region in a light-shielded state and a plurality of signals read from the second row of the effective region in the light-shielded state, and
the horizontal streak correction circuit selects the first offset correction according to the amplification factor, when the amplification factor is equal to or smaller than the predetermined amplification factor and the environmental temperature is out of a predetermined temperature range including the predetermined temperature.

13. The image pickup apparatus according to claim 12, wherein
the horizontal streak correction circuit does not perform the selection according to the amplification factor, when the amplification factor is equal to or smaller than the predetermined amplification factor and the environmental temperature is within the predetermined temperature range, but perform any one of the first offset correction and the second offset correction.

14. The image pickup apparatus according to claim 8, further comprising an image sensor including the pixel region and the reading circuit, wherein
the image sensor further includes a sensor amplifier circuit configured to amplify a signal read by the reading circuit by a sensor amplification factor, and
the horizontal streak correction circuit selects the first offset correction or the second offset correction based on both the amplification factor and the sensor amplification factor.

15. The image pickup apparatus according to claim 1, wherein
the horizontal streak correction circuit acquires an average value of pixel signals for a plurality of frames, the pixel signals being obtained after performing the first offset correction on pixel signals each obtained from the plurality of signals read from the second row of the effective region in each of images of the plurality of frames acquired from the pixel region in a light-shielded state, the pixel signals after the first offset correction corresponding to an offset remaining in a result of the first offset correction, and
in the first offset correction on pixel signals each obtained from a plurality of signals acquired in a non-light-shielded state and read from the second row of the effective region, the horizontal streak correction circuit performs the first offset correction, using a value obtained by correcting, based on the average value, a correction value acquired based on the pixel signal read from the first row of the light-shielding region and the plurality of signals read from the second row of the light-shielding region.

16. The image pickup apparatus according to claim 1, wherein
the image processing circuit further includes a γ-correction circuit configured to correct the image data based on a γ-correction characteristic, and a noise reduction circuit configured to perform noise reduction processing on the image data, and
the parameter includes a gradient of the γ-correction characteristic in a certain input pixel value and an intensity of the noise reduction processing.

17. The image pickup apparatus according to claim 1, wherein
the image processing circuit further includes a γ-correction circuit configured to correct the image data based on a γ-correction characteristic, and an amplifier circuit configured to amplify the pixel signal read from the first row of the effective region and the plurality of signals read from the second row of the effective region by a set amplification factor, and
the parameter includes a gradient of the γ-correction characteristic in a certain input pixel value and the amplification factor.

18. An image pickup apparatus comprising:
a pixel region in which a plurality of pixels each including one microlens and a plurality of photoelectric conversion devices are two-dimensionally arranged in a unit of row, the pixel region comprising a light-shielding region having a plurality of light-shielded rows and an effective region having a plurality of rows to which light reaches;
a reading circuit configured to read, from each pixel in a first row of each of the light-shielding region and the effective region, a pixel signal obtained by adding all signals of the plurality of photoelectric conversion devices, and to read, from each pixel in a second row of each of the light-shielding region and the effective region, a plurality of signals including phase difference information;
a horizontal streak correction circuit configured to perform one of a first offset correction and a second offset correction on the pixel signal read from the first row of the effective region, the first offset correction being based on the pixel signal read from the first row of the light-shielding region and the plurality of signals read from the second row of the light-shielding region, the second offset correction being based on a value determined in advance; and
an image processing circuit configured to perform image processing on image data according to a parameter, the image data being configured based on the pixel signal subjected to the first offset correction or the second offset correction and the pixel signal obtained from the plurality of signals read from the second row of the effective region, wherein the horizontal streak correction circuit selects which of the first offset correction and the second offset correction to perform, according to the parameter.

19. An image processing method comprising:

reading a pixel signal obtained by adding all signals of a plurality of photoelectric conversion devices, from each pixel in a first row of each of a light-shielding region and an effective region in a pixel region in which a plurality of pixels each including one microlens and the plurality of photoelectric conversion devices are two-dimensionally arranged in a unit of row, the pixel region comprising the light-shielding region having a plurality of light-shielded rows and the effective region having a plurality of rows to which light reaches;

reading a plurality of signals including phase difference information from each pixel in a second row of each of the light-shielding region and the effective region;

performing one of a first offset correction and a second offset correction on a pixel signal obtained from the plurality of signals read from the second row of the effective region, the first offset correction being based on the pixel signal read from the first row of the light-shielding region and the plurality of signals read from the second row of the light-shielding region, the second offset correction being based on a value determined in advance;

performing image processing on image data according to a parameter, the image data being configured based on the pixel signal subjected to the first offset correction or the second offset correction and the pixel signal read from the first row of the effective region, and selecting which of the first offset correction and the second offset correction to perform, according to the parameter.

20. The image processing method according to claim 19, further comprising performing noise reduction processing on the image data, wherein the parameter includes an intensity of the noise reduction processing, and the method includes selecting the first offset correction when the intensity is equal to or lower than a predetermined intensity and selecting the second offset correction when the intensity is higher than the predetermined intensity.

* * * * *